(12) United States Patent
Islam et al.

(10) Patent No.: US 10,097,254 B2
(45) Date of Patent: Oct. 9, 2018

(54) CHANNEL STATE INFORMATION ESTIMATION AND CHANNEL INFORMATION REPORTING

(71) Applicant: QUALCOMM Incorporated, San Diego, CA (US)

(72) Inventors: Muhammad Nazmul Islam, Edison, NJ (US); Krishna Kiran Mukkavilli, San Diego, CA (US); Juergen Cezanne, Ocean Township, NJ (US); Tao Luo, San Diego, CA (US); Sundar Subramanian, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 15/369,069

(22) Filed: Dec. 5, 2016

(65) Prior Publication Data
US 2017/0302352 A1    Oct. 19, 2017

Related U.S. Application Data

(60) Provisional application No. 62/324,203, filed on Apr. 18, 2016, provisional application No. 62/324,684, filed on Apr. 19, 2016.

(51) Int. Cl.
*H04B 7/06* (2006.01)
*H04W 72/04* (2009.01)
(Continued)

(52) U.S. Cl.
CPC ......... *H04B 7/0626* (2013.01); *H04L 5/0048* (2013.01); *H04L 5/0057* (2013.01);
(Continued)

(58) Field of Classification Search
CPC .................................................. H04B 7/0626
See application file for complete search history.

(56) References Cited

U.S. PATENT DOCUMENTS

| 8,477,888 | B2 | 7/2013 | Lu et al. |
| 9,036,747 | B2 | 5/2015 | Chiang et al. |

(Continued)

OTHER PUBLICATIONS

Pitarokoilis, et al., Uplink Performance of Time-Reversal MRC in Massive MIMO Systems Subject to Phase Notice, Sep. 8, 2014, 13 pages.

(Continued)

*Primary Examiner* — Jason E Mattis
(74) *Attorney, Agent, or Firm* — Clint R. Morin; Holland & Hart

(57) ABSTRACT

Methods, systems, and devices for wireless communication are described. A base station may transmit a phase noise correction reference signal (PC-RS) and a channel state information reference signal (CSI-RS) during a symbol period of a subframe. A user equipment (UE) may identify a first channel information using the PC-RS and the CSI-RS. The UE may transmit a channel information message to the base station that includes the first channel information. The first channel information may include a phase noise corrected channel measurement. The UE may the CSI-RS during the symbol period. Channel and phase noise estimates may be generated using a joint estimation based on the CSI-RS. The CSI-RS may be repeated periodically. In some cases, the UE may additionally or alternatively receive pilot tones that may include PC-RSs. The joint estimation may be further based on the pilot tones.

28 Claims, 30 Drawing Sheets

(51) Int. Cl.
*H04W 72/08* (2009.01)
*H04L 5/00* (2006.01)
*H04L 25/02* (2006.01)

(52) U.S. Cl.
CPC ...... *H04L 25/0204* (2013.01); *H04L 25/0228* (2013.01); *H04W 72/042* (2013.01); *H04W 72/0413* (2013.01); *H04W 72/082* (2013.01); *H04L 5/0023* (2013.01)

(56) References Cited

U.S. PATENT DOCUMENTS

| | | | |
|---|---|---|---|
| 9,351,177 B2 | 5/2016 | Nagata et al. | |
| 9,585,044 B2* | 2/2017 | Park | H04W 24/10 |
| 2009/0316842 A1* | 12/2009 | Lu | H04L 1/20 |
| | | | 375/346 |
| 2013/0114661 A1* | 5/2013 | Chiang | H04L 25/0202 |
| | | | 375/229 |
| 2013/0258897 A1* | 10/2013 | Park | H04B 7/0626 |
| | | | 370/252 |
| 2014/0226612 A1* | 8/2014 | Kim | H04B 7/024 |
| | | | 370/329 |
| 2014/0254708 A1 | 9/2014 | Seo et al. | |
| 2015/0318908 A1* | 11/2015 | Ko | H04L 1/00 |
| | | | 375/267 |
| 2017/0180194 A1* | 6/2017 | Noh | H04L 41/08 |
| 2017/0294926 A1* | 10/2017 | Islam | H04B 1/1027 |
| 2017/0373741 A1* | 12/2017 | Yang | H04B 7/0623 |
| 2018/0006700 A1* | 1/2018 | Frenne | H04B 7/0626 |

OTHER PUBLICATIONS

ETRI, "Discussion on NR Downlink Reference Signal Design," 3GPP TSG RAN WG1 Meeting #87, R1-1612219, Reno, Nevada, Nov. 14-18, 2016, 6 pgs., XP051190346, 3rd Generation Partnership Project.

Huang et al., "Phase Noise and Frequency Offset Compensation in High Frequency MIMO-OFDM System," 2015 IEEE International Conference on Communications (ICC), Jun. 1, 2015, pp. 1280-1285, XP055376917, DOI: 10.1109/ICC.2015.7248499 ISBN: 978-1-4673-6432-4, Institute of Electrical and Electronics Engineers.

Interdigital Communications, "Reference Signal Principles for NR," 3GPP TSG-RAN WG1 Meeting #84bis, R1-162578, Busan, Korea, Apr. 11-15, 2016, 3 pgs., XP051080267, 3rd Generation Partnership Project.

ISA/EP, International Search Report and Written Opinion of the International Searching Authority, Int'l Application No. PCT/US2017/023510, Jun. 14, 2017, European Patent Office, Rijswijk, NL, 18 pgs.

Nokia et al., "On PT-RS Design for NR," 3GPP TSG RAN WG1 Meeting #88, R1-1703182, Athens, Greece, Feb. 13-17, 2017, 7 pgs., XP051210318, 3rd Generation Partnership Project.

Qualcomm Incorporated, "DM-RS Enhancements for V2V PSCCH and PSSCH," 3GPP TSG-RAN WG1 Meeting #84bis, R1-163029, Busan, South Korea, Apr. 11-15, 2016, 7 pgs., XP051080473, 3rd Generation Partnership Project.

Qualcomm Incorporated, "Phase and Frequency Tracking Reference Signal Considerations," 3GPP TSG-RAN WG1 Meeting #87AH, R1-1700808, Spokane, USA, Jan. 16-20, 2017, 7 pgs., XP051203121, 3rd Generation Partnership Project.

* cited by examiner

| 405-c | 410-c | 415-c | | | | | | | | | 420-c | |
|---|---|---|---|---|---|---|---|---|---|---|---|---|
| | DMRS | | | | | | | | | | AP 1 | |
| | DMRS | | | | | | | | | | AP 2 | |
| | DMRS | | | | | | | | | | AP 3 | |
| | NULL | NULL | NULL | NULL | NULL | NULL | NULL | NULL | NULL | NULL | NULL | |
| | PC-RS | PC-RS | PC-RS | PC-RS | PC-RS | PC-RS | PC-RS | PC-RS | PC-RS | PC-RS | PC-RS | |
| | NULL | NULL | NULL | NULL | NULL | NULL | NULL | NULL | NULL | NULL | NULL | |
| | DMRS | | | | | | | | | | AP 4 | |
| | DMRS | | | | | | | | | | AP 1 | |
| | DMRS | | | | | | | | | | AP 2 | |

430-c points to the NULL column; 425-c points to the PC-RS column.

CHANNEL STATE INFORMATION ESTIMATION AND CHANNEL INFORMATION REPORTING

CROSS REFERENCES

The present Application for Patent claims priority to U.S. Provisional Patent Application No. 62/324,203 by Islam, et al., entitled "Channel Information Reporting," filed Apr. 18, 2016 and to U.S. Provisional Patent Application No. 62/324,684 by Islam, et al., entitled "CSI Estimation With Phase Noise" filed Apr. 19, 2016, assigned to the assignee hereof, and each of which is expressly incorporated by reference herein.

BACKGROUND

The following relates generally to wireless communication, and more specifically to channel state information estimation using phase noise and channel information reporting.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

Wireless communications system may use various reference signals to determine channel information, e.g., channel measurement and feedback reporting. For example, channel state information reference signals (CSI-RS) allows a UE to estimate narrowband channel performance for different antenna ports at the transmitting base stations. Some wireless communications may operate in the millimeter wave (mmW) spectrum that may utilize beamforming to increase the strength of wireless signals. In some cases, mmW transceivers may experience higher phase noise levels than non-mmW transceivers, e.g., transceivers configured for communications in the sub-6 GHz spectrum. The increased phase noise may be based on a higher frequency ratio between a local oscillator and a temperature compensated crystal oscillator of the transceiver, noisier voltage controlled oscillators, etc. In some examples, the UE (e.g., the receiver in downlink communications) may generate a large portion of the phase noise in the received signals, e.g., the oscillator components in the UE transceiver may have higher tolerance levels, may be manufactured using less expensive components, etc. In some scenarios, the phase noise may cause variations in phase of received signals within the duration of a single symbol.

Some wireless communications systems may operate in the millimeter wave (mmW) spectrum and may utilize beamforming to increase the strength of wireless signals. In some cases, mmW transceivers may experience higher phase noise levels than non-mmW transceivers (e.g., transceivers configured for communications in the sub-6 GHz spectrum). The increased phase noise may be based on a higher frequency ratio between a local oscillator and a temperature compensated crystal oscillator of the transceiver, noisier voltage controlled oscillators, etc. In some examples, the UE (e.g., the receiver in downlink communications) may generate a large portion of the phase noise in the received signals (e.g., the oscillator components in the UE transceiver may have higher tolerance levels, may be manufactured using less expensive components, etc.). In some cases, the phase noise may cause variations in phase of received signals within the duration of a single symbol. Phase noise variation may lead to signal reception errors, and may degrade system performance.

SUMMARY

The described techniques relate to improved methods, systems, devices, or apparatuses that support channel information reporting. For example, the described techniques provide for a base station to inform a UE of the format indicator for a channel information message, e.g., the channel performance feedback message. The format indicator may indicate that the base station is requesting a phase noise corrected channel measurement, a non-phase noise corrected channel measurement, or both measurements. The base station may transmit a phase noise compensation reference signal (PC-RS) and CSI-RS(s) to the UE. The base station may transmit the PC-RS and the CSI-RS to the UE during a symbol period of a subframe, e.g., at the same time. The UE may receive the PC-RS and the CSI-RS(s) during the symbol period and use the PC-RS and the CSI-RS to identify a first channel information. The UE may transmit the channel information message to the base station that includes the first channel information. In some examples, the UE may additionally or alternatively identify a second channel information based on the CSI-RS and include the second channel information in the channel information message. The first channel information may be a phase noise corrected channel measurement and the second channel information may be a non-phase noise corrected channel measurement, as requested by the format indicator from the base station. Thus, the base station may receive feedback information associated with the channel performance as well as the phase noise in the UE received signal that was generated by the channel and/or the UE components. The base station may use this information for improved resource assignment, modulation and coding scheme (MCS) assignment, etc.

A user equipment (UE) may receive a channel state information reference signal (CSI-RS) during a symbol period. A channel estimate and phase noise estimate may be generated using a joint estimation based on the CSI-RS. In some cases, the CSI-RS may be repeated periodically. In some cases, the UE may additionally or alternatively receive pilot tones that may include phase noise compensation reference signals (PC-RSs). The joint estimation may additionally or alternatively be based on the pilot tones. The pilot tones may be surrounded by null tones in the frequency domain. A frequency hopping pattern may be used to adjust the location of the pilot tones in the frequency domain. The number of pilot tones may be adjusted based on a category associated with the UE. The UE may then transmit a channel information message to a base station based on the channel estimate and the phase noise estimate.

A method of wireless communication is described. The method may include receiving, at a UE during a symbol period, at least one PC-RS and at least one CSI-RS, identifying first channel information based at least in part on both the CSI-RS and the PC-RS and transmitting a channel information message to a base station, the channel information message comprising the first channel information.

An apparatus for wireless communication is described. The apparatus may include means for receiving, at a UE during a symbol period, at least one PC-RS and at least one CSI-RS, means for identifying first channel information based at least in part on both the CSI-RS and the PC-RS and means for transmitting a channel information message to a base station, the channel information message comprising the first channel information.

A further apparatus is described. The apparatus may include a processor, memory in electronic communication with the processor, and instructions stored in the memory. The instructions may be operable to cause the processor to receive, at a UE during a symbol period, at least one PC-RS and at least one CSI-RS, identify first channel information based at least in part on both the CSI-RS and the PC-RS and transmit a channel information message to a base station, the channel information message comprising the first channel information.

A non-transitory computer readable medium for wireless communication is described. The non-transitory computer-readable medium may include instructions to cause a processor to receive, at a UE during a symbol period, at least one PC-RS and at least one CSI-RS, identify first channel information based on both the CSI-RS and the PC-RS and transmit a channel information message to a base station, the channel information message comprising the first channel information.

Some examples of the method, apparatus, or non-transitory computer-readable medium described above may additionally or alternatively include processes, features, means, or instructions for identifying a second channel information based on the CSI-RS. Some examples of the method, apparatus, or non-transitory computer-readable medium described above may additionally or alternatively include processes, features, means, or instructions for transmitting the channel information message to the base station, the channel information message additionally or alternatively comprising the second channel information.

Some examples of the method, apparatus, or non-transitory computer-readable medium described above may additionally or alternatively include processes, features, means, or instructions for identifying a channel measurement based on the CSI-RS, the second channel information comprising a non-phase noise corrected channel measurement. Some examples of the method, apparatus, or non-transitory computer-readable medium described above may additionally or alternatively include processes, features, means, or instructions for generating the channel information message that comprises the first channel information and the second channel information.

In some examples of the method, apparatus, or non-transitory computer-readable medium described above, the first channel information and the second channel information comprises at least one of a channel quality information (CQI), a rank indicator, a precoding matrix indicator, a beam indicator, or combinations thereof. Some examples of the method, apparatus, or non-transitory computer-readable medium described above may additionally or alternatively include processes, features, means, or instructions for identifying a channel measurement based on the CSI-RS. Some examples of the method, apparatus, or non-transitory computer-readable medium described above may additionally or alternatively include processes, features, means, or instructions for identifying a phase noise correction factor based at least in part on the PC-RS, the first channel information comprising a phase noise corrected channel measurement.

Some examples of the method, apparatus, or non-transitory computer-readable medium described above may additionally or alternatively include processes, features, means, or instructions for receiving, from the base station, a channel reporting format message that comprises a format indicator for the channel information message. In some examples of the method, apparatus, or non-transitory computer-readable medium described above, the channel reporting format message is received on a physical downlink control channel (PDCCH).

Some examples of the method, apparatus, or non-transitory computer-readable medium described above may additionally or alternatively include processes, features, means, or instructions for decoding a one or more bits in a downlink control indicator (DCI) that conveys the indication of the format indicator for the channel information message. In some examples of the method, apparatus, or non-transitory computer-readable medium described above, the format indicator comprises at least one of a request for the UE to report the first channel information or the second channel information or a request for the UE to report both the first channel information and the second channel information.

In some examples of the method, apparatus, or non-transitory computer-readable medium described above, the channel information message is transmitted on a physical uplink control channel (PUCCH). In some examples of the method, apparatus, or non-transitory computer-readable medium described above, the channel information message is transmitted in a random access channel (RACH) subframe. In some examples of the method, apparatus, or non-transitory computer-readable medium described above, the channel information message is transmitted in an uplink control information (UCI) of a physical uplink shared channel (PUSCH).

In some examples of the method, apparatus, or non-transitory computer-readable medium described above, may include transmitting, to a UE during a symbol period, at least one PC-RS and at least one CSI-RS and receiving a channel information message comprising a first channel information, the first channel information is based at least in part on the CSI-RS and the PC-RS.

In some examples of the method, apparatus, or non-transitory computer-readable medium described above, the first channel information comprises a phase noise corrected channel measurement. In some examples of the method, apparatus, or non-transitory computer-readable medium described above, the channel information message additionally or alternatively comprises a second channel information based on the CSI-RS.

In some examples of the method, apparatus, or non-transitory computer-readable medium described above, the second channel information comprises a non-phase noise corrected channel measurement. Some examples of the method, apparatus, or non-transitory computer-readable medium described above may additionally or alternatively include processes, features, means, or instructions for receiving the channel information message comprising both the first channel information and the second channel information.

In some examples of the method, apparatus, or non-transitory computer-readable medium described above, the first channel information and the second channel information comprises at least one of a CQI, a rank indicator, a precoding matrix indicator, a beam indicator, or combinations thereof. Some examples of the method, apparatus, or non-transitory computer-readable medium described above may additionally or alternatively include processes, features, means, or instructions for transmitting, to the UE, a channel reporting format message that comprises a format indicator for the channel information message.

In some examples of the method, apparatus, or non-transitory computer-readable medium described above, the channel reporting format message is transmitted on a PDCCH. In some examples of the method, apparatus, or non-transitory computer-readable medium described above, the format indicator comprises at least one of a request for the UE to report the first channel information or a request for the UE to report the first channel information and the second channel information.

Some examples of the method, apparatus, or non-transitory computer-readable medium described above may additionally or alternatively include processes, features, means, or instructions for reserving one or more bits in a DCI to convey the indication of the format indicator for the channel information message. In some examples of the method, apparatus, or non-transitory computer-readable medium described above, the channel information message is received on a PUCCH.

In some examples of the method, apparatus, or non-transitory computer-readable medium described above, the channel information message is received in a RACH subframe. In some examples of the method, apparatus, or non-transitory computer-readable medium described above, the channel information message is received in an UCI of a PUSCH.

In some examples of the method, apparatus, or non-transitory computer-readable medium described above, may include receiving at least one CSI-RS during a symbol period, generating a channel estimate and a phase noise estimate using a joint estimation based at least in part on the CSI-RS and transmitting a channel information message to a base station based at least in part on the channel estimate and the phase noise estimate.

Some examples of the method, apparatus, or non-transitory computer-readable medium described above may additionally or alternatively include processes, features, means, or instructions for identifying a set of pilot tones adjacent to each other, where the joint estimation is based at least in part on the set of pilot tones.

In some examples of the method, apparatus, or non-transitory computer-readable medium described above, the set of pilot tones are surrounded in the frequency domain by a set of null tones. In some examples of the method, apparatus, or non-transitory computer-readable medium described above, the set of pilot tones comprise PC-RSs.

Some examples of the method, apparatus, or non-transitory computer-readable medium described above may additionally or alternatively include processes, features, means, or instructions for adjusting a location of the set of pilot tones in the frequency domain. In some examples of the method, apparatus, or non-transitory computer-readable medium described above, the adjusting is based on a frequency hopping pattern.

Some examples of the method, apparatus, or non-transitory computer-readable medium described above may additionally or alternatively include processes, features, means, or instructions for determining a category associated with a receiving device. Some examples of the method, apparatus, or non-transitory computer-readable medium described above may additionally or alternatively include processes, features, means, or instructions for adjusting a number of the set of pilot tones based on the determined category.

Some examples of the method, apparatus, or non-transitory computer-readable medium described above may additionally or alternatively include processes, features, means, or instructions for receiving an indication of the category via radio resource control (RRC) signaling. Some examples of the method, apparatus, or non-transitory computer-readable medium described above may additionally or alternatively include processes, features, means, or instructions for receiving a periodic signal comprising at least one repetition of the CSI-RS, where the joint estimation is based on the periodic signal.

In some examples of the method, apparatus, or non-transitory computer-readable medium described above, the periodic signal in time domain is generated by inserting a CSI-RS tone in every n-th tone of the periodic signal and by inserting null values in other tones of the periodic signal. In some examples of the method, apparatus, or non-transitory computer-readable medium described above, the n is determined based on a category of a receiving device.

Some examples of the method, apparatus, or non-transitory computer-readable medium described above may additionally or alternatively include processes, features, means, or instructions for transmitting an indication of the category via radio resource control (RRC) signaling.

Some examples of the method, apparatus, or non-transitory computer-readable medium described above may additionally or alternatively include processes, features, means, or instructions for identifying a time periodicity of the periodic signal. Some examples of the method, apparatus, or non-transitory computer-readable medium described above may additionally or alternatively include processes, features, means, or instructions for determining a phase noise variation based on the CSI-RS, the periodic signal, and a time periodicity of the periodic signal, where the joint estimation is based on the phase noise variation. In some examples of the method, apparatus, or non-transitory computer-readable medium described above, the channel estimate comprises a channel estimation for each of a set of antenna ports.

Some examples of the method, apparatus, or non-transitory computer-readable medium described above, may include transmitting at least one CSI-RS and receiving a channel information message from a user equipment (UE), the channel information message based at least in part on a channel estimate and a phase noise estimate generated using a joint estimation based at least in part on the CSI-RS.

Some examples of the method, apparatus, or non-transitory computer-readable medium described above may additionally or alternatively include processes, features, means, or instructions for transmitting a set of pilot tones adjacent to each other, where the joint estimation is based on the set of pilot tones. In some examples of the method, apparatus, or non-transitory computer-readable medium described above, the set of pilot tones are surrounded in the frequency domain by a set of null tones.

Some examples of the method, apparatus, or non-transitory computer-readable medium described above may additionally or alternatively include processes, features, means, or instructions for transmitting a periodic signal comprising at least one repetition of the CSI-RS, where the joint estimation is based on the periodic signal. In some examples of the method, apparatus, or non-transitory computer-readable medium described above, the channel estimate comprises a channel estimation for each of a set of antenna ports.

BRIEF DESCRIPTION OF THE DRAWINGS

FIGS. 4A through 4D illustrate examples of subframe structures that support CSI estimation with phase noise in accordance with aspects of the present disclosure;

DETAILED DESCRIPTION

Some wireless devices may be manufactured using components with higher tolerance thresholds, with reduced capabilities, etc. For example, the components used to manufacture a UE may be selected based on performance as well as the costs associated with mass production of the UEs. While such components may be suitable for traditional wireless communications, advanced wireless communication systems may operate in the mmW spectrum, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. In some examples, traditional UE components may generate or contribute to phase noise in the received signal and, in some scenarios, phase noise within a symbol period of a subframe.

A UE may jointly estimate a channel and phase noise in the presence of channel state information reference signals (CSI-RSs). The combined use of CSI-RSs and PC-RSs may allow a UE to estimate channels for different antenna ports, in addition to phase noise variation both within a single symbol and across multiple symbols. Measurements of CSI-RSs may be used to identify transmitting base station antenna ports associated with reduced path loss. CSI-RSs and a set of null tones may be repeated to estimate phase noise variation. The base station may repeat the same CSI-RS multiple times within a symbol. The UE may then identify phase noise for each portion of the CSI-RS repetition (e.g., each individual CSI-RS), and estimate phase noise variation across the CSI-RS portions.

Aspects of the disclosure are initially described in the context of a wireless communication system. For example, a base station may transmit a PC-RS and CSI-RS(s) in a symbol period to a UE. The UE may use the PC-RS and the CSI-RS(s) to identify a first channel information and transmit a channel information message to the base station that includes the first channel information. The first channel information may be a phase noise corrected channel measurement. In some examples, the UE may use the CSI-RS to identify a second channel information and include the second channel information in the channel information message to the base station. The second channel information may be a non-phase noise corrected channel measurement. The base station may transmit an indication to the UE of which information to feed back, e.g., which channel information to include in the channel information message. Examples of wireless systems supporting CSI estimation with phase noise, in addition to example subframe configurations enabling these estimations are then described. Aspects of the disclosure are additionally or alternatively illustrated by and described with reference to apparatus diagrams, system diagrams, and flowcharts that relate to channel information reporting.

Figure 1:
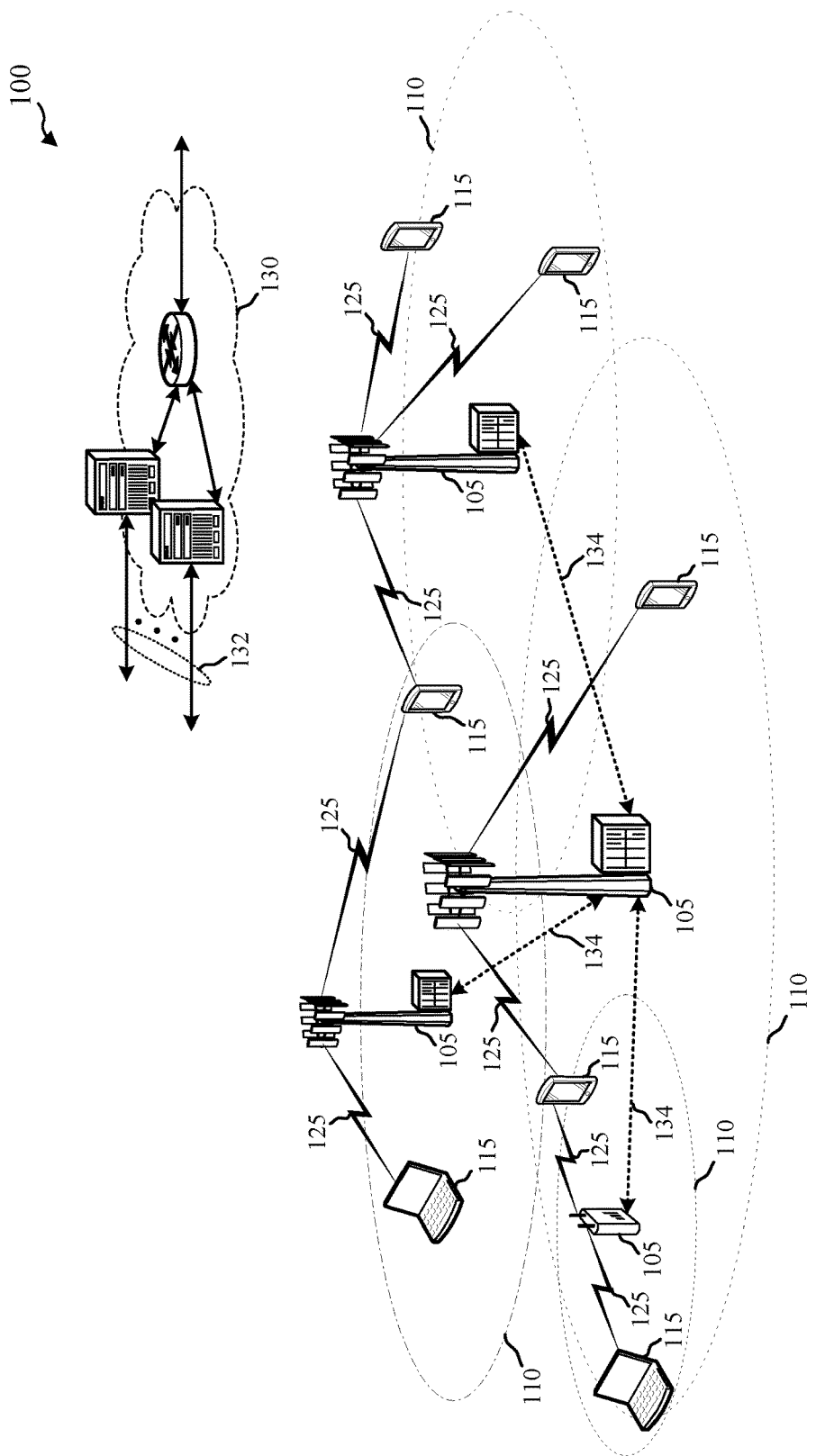
FIG. 1 illustrates an example of a wireless communications system that supports channel information reporting in accordance with aspects of the present disclosure.

FIG. 1 illustrates an example of a wireless communications system 100 in accordance with various aspects of the present disclosure. The wireless communications system 100 includes base stations 105, UEs 115, and a core network 130. Wireless communications system 100 may support channel information reporting using a PC-RS and CSI-RS transmitted during a symbol time period to provide phase noise compensated feedback reporting.

Wireless communications system 100 may operate in an ultra-high frequency (UHF) frequency or mmW region using frequency bands from 700 MHz to 2600 MHz (2.6 GHz), although in some cases wireless local area network (WLAN) networks may use frequencies as high as 4 GHz. This region may additionally or alternatively be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum.

In mmW systems, signals may be beam-formed to meet a certain link budget (e.g., an accounting of gains and losses associated with transmitters and receivers when communicating over a medium). In such cases, base stations 105 may use multiple antenna ports coupled with subarrays of antennas to form the beams in various directions using a number of analog weight factors. A base station 105 may thus transmit symbols in multiple directions, where the direction may change in each symbol of a synchronization subframe.

Radios associated with higher frequencies may have higher phase noise levels (e.g., mmW radios experience higher phase noise than sub-6 GHz radios). In high frequency communication systems such as mmW systems, phase noise may be increased due to the high carrier frequencies and the relatively higher voltages needed for signal filtering. Specifically, noisier voltage controlled oscillators and higher frequency ratios between local oscillators and temperature compensated crystal oscillators may result in phase noise. The severity of experienced phase noise may depend on the path loss of the signal and the receivers antenna gain. The receiver of a UE 115 (e.g., in downlink) may lead to the majority of phase noise A phase noise compensation reference signal (PC-RS) may allow the UE 115 to estimate phase noise.

Phase noise may cause variations in phase over the duration of a single symbol or across multiple symbols. Phase variation within a single symbol (e.g., within the duration of a symbol the phase changes from 0 degrees to 10 degrees) may lead to signal reception errors, particularly in systems associated with high data rates. For example, high order modulation systems (e.g., 64 quadrature amplitude modulation (QAM), 256 QAM, etc.) may experience significant reception errors in environments where the phase of the signal varies within the duration of a single symbol. PC-RSs may be included in these systems. Demodulation reference signals (DMRS)

Beamforming may improve communications in high frequency communication systems such as mmW systems. Path loss issues common in mmW systems may be mitigated through use of beamforming at both a UE 115 and a base station 105. The number of beams available for beamforming may directly correlate with the number of antenna ports at the base station 105. For example, if a base station 105 has eight antenna ports, the base station 105 may convert eight different directional beams in one symbol.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may additionally or alternatively be referred to as a mobile station, a subscriber station, a remote unit, a wireless device, an access terminal (AT), a handset, a user agent, a client, or like terminology. A UE 115 may additionally or alternatively be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may additionally or alternatively be referred to as eNodeBs (eNBs) 105. In some cases, UE or base station antennas may be located within one or more antenna arrays. For example, one or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

Base station 105 may broadcast a channel state information reference signal (CSI-RS) to allow a UE 115 for estimation of narrowband channels for different antenna ports of base station 105. That is, a CSI-RS may allow a UE 115 to determine which base station antenna ports are associated with beams that have less path loss relative to other available antenna ports. In some cases, the RSs for different antenna ports may be scheduled in the last one or two symbols of a subframe. Each antenna port may have a different RS that are repeated after other RSs associated with the remaining antenna ports. Using this information, the UE 115 may identify a beam associated with the lowest path loss and indicate the corresponding antenna port or beam identification (ID) to the base station 105. The base station 105 may then perform frequency dependent channel scheduling of the UE 115 according to the indication.

Wireless communications system 100 may include base stations 105 transmitting reference signals to support channel measurement and performance feedback information from the UE 115. Different reference signals may be used for channel measurement and feedback reporting. For example, demodulation reference signals (DM-RS) may be used for uplink channel measurements by base station 105. Another example includes CSI-RS that may be transmitted during a symbol period. The CSI-RS may be transmitted from the base station 105 using different antenna ports. The CSI-RS may use frequency and/or code orthogonality, in some scenarios. In another example, a PC-RS may be used by UE 115 to estimate phase noise interference, e.g., phase noise introduced in the channel and/or by the components of the UE 115. The PC-RS may be transmitted during multiple symbol periods of a subframe, during one or more symbol periods of the subframe, etc. The number of PC-RS(s) that are transmitted during a subframe may be based on the various factors, e.g., based on previous phase noise feedback reporting.

The feedback may include channel state information (CSI), e.g., a channel information message, that UE 115 transmits to base station 105. Examples of CSI feedback information may include, but are not limited to a channel quality indicator (CQI), a precoding matrix indicator (PMI), a precoding type indicator (PTI), a rank indicator (RI), a beam indicator, etc. The CSI feedback information may be phase noise corrected channel measurements and/or non-phase noise phase noise corrected channel measurements. Base station 105 may indicate which channel information to include in the feedback message, e.g., whether to include one or both of the phase noise corrected or non-phase noise corrected feedback information. In some examples, the reference signal may be beamformed transmitted to the UE 115.

Thus, a base station 105 may transmit a CSI-RS and a PC-RS during a symbol period of a subframe. The UE 115 may receive and use the CSI-RS and the PC-RS to identify first channel information. The first channel information may include a phase noise corrected channel measurement, e.g., a phase noise corrected CQI, etc. The UE 115 may use the CSI-RS to identify a second channel information that may include a non-phase noise corrected channel measurement. In some examples, base station 105 may transmit a message to the UE 115 that indicates which format the UE 115 is to use for the channel information reporting, e.g., whether to include the phase noise corrected channel measurement, the non-phase noise corrected channel measurement, or both.

Figure 2:
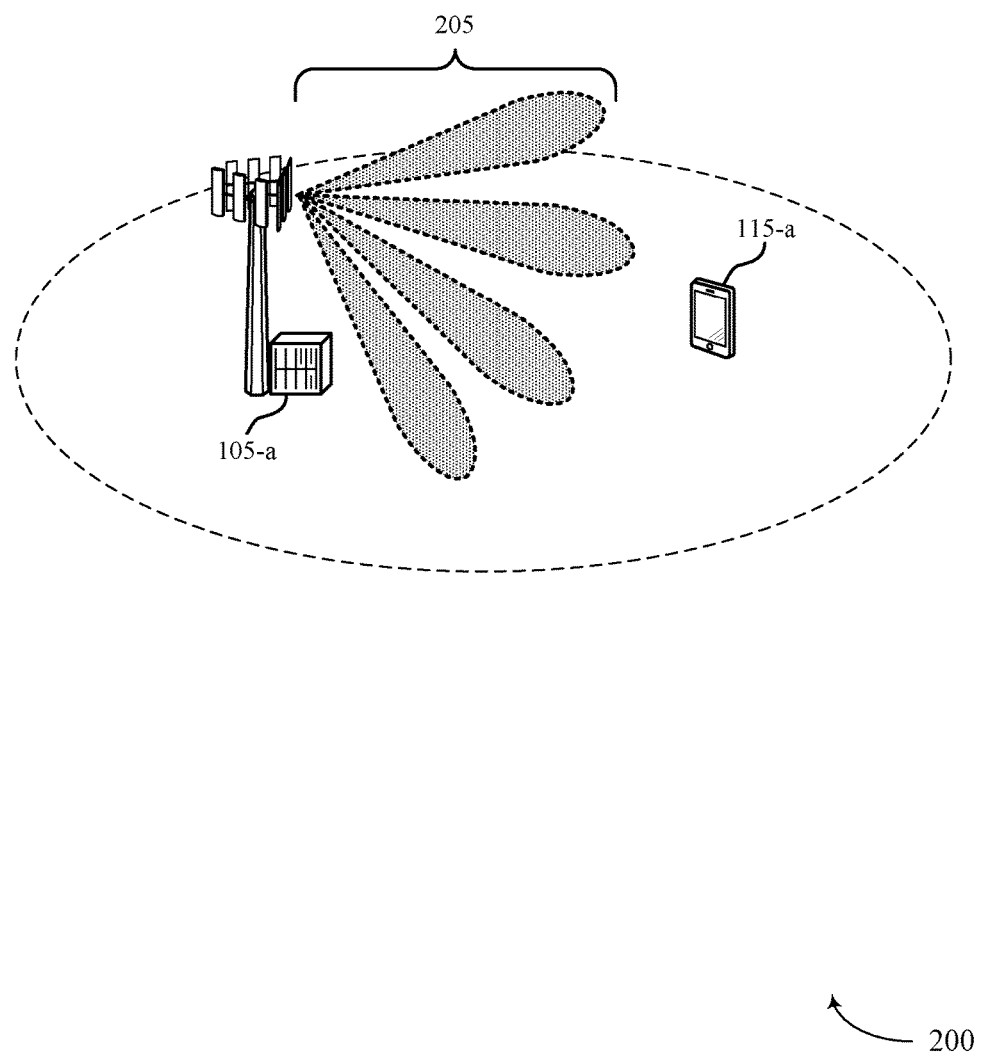
FIG. 2 illustrates an example of a wireless communications system that supports channel information reporting in accordance with aspects of the present disclosure.

FIG. 2 illustrates an example of a wireless communications system 200 for channel information reporting and CSI estimation with phase noise. Wireless communications system 200 may include base station 105-a and UE 115-a, which may be examples of the corresponding devices described with reference to FIG. 1. Base station 105-a and UE 115-a may communicate using directional beams 205. Wireless communications system 200 may support channel measurement and reporting that uses a CSI-RS and a PC-RS in the same symbol period. Wireless communications system 200 represents a system that supports CSI estimation with phase noise. Estimation of CSI with phase noise may be based on CSI-RSs or, in some cases, PC-RSs.

Wireless system 200 may utilize reference signals that may be beam-formed to meet a certain link budget (e.g., an accounting of gains and losses associated with transmitters and receivers when communicating over a medium). For example, base station 105-a may use multiple antenna ports coupled with subarrays of antennas to form beams in various directions using a number of analog weighting factors. Base station 105-a may thus transmit reference symbols in multiple directions, where the directions may change in each symbol of a subframe, in each subframe, etc.

Broadly, wireless system 200 may include PC-RS being transmitted in the same symbol period with CSI-RS. UE 115-a may use the PC-RS and the CSI-RS to estimate the channel in two scenarios, e.g., one scenario where phase noise correction is included and another scenario where phase noise correction is not included. UE 115-a may provide feedback information to the base station 105-a that includes one or both types of the CSI, e.g., phase noise corrected or non-phase noise corrected. Base station 105-a may use the feedback information when scheduling communications for UE 115-a, e.g., when scheduling downlink communications on a physical downlink shared channel (PDSCH). In some examples, base station 105-a may inform UE 115-a which CSI information is to be included in the feedback messages.

Thus, according to some aspects wireless system 200 may include PC-RS being transmitted simultaneously with CSI-RSs. UE 115-a may generate channel information based on the transmitted reference signals. UE 115-a may use the PC-RS to determine or identify channel information, e.g., phase noise corrected channel measurements. UE 115-a may not use the PC-RS to find channel information, e.g., non-phase noise corrected channel measurements, in some examples. Thus, UE 115-a may generate two different types of channel information, one with the help of PC-RS and the other without using PC-RS. UE 115-a may feed back the channel information to the base station 105-a. The channel information may represent one or multiple parameters of channel quality information, rank indication, precoding matrix information, beam direction, etc. Base station 105-a may inform or indicate to UE 115-a to generate the two different types of channel information using a physical downlink control channel (PDCCH). Base station 105-a may inform or indicate to UE 115-a whether to feed back one or both types to channel information to base station 105-a. Base station 105-a may reserve bits in a downlink control indicator (DCI) to convey the indication to the UE 115-a about the types of CSI reporting to use. UE 115-a may feed back the channel information to base station 105-a on a physical uplink control channel (PUCCH). UE 115-a may feed back the channel information to base station 105-a in a random access channel (RACH) subframe.

Thus, base station 105-a may support channel performance measurements and reporting that include phase noise channel measurements and/or non-phase noise corrected phase noise channel measurements. Base station 105-a may transmit, to UE 115-a, a channel reporting format message that includes a format indicator for a channel information message. The channel reporting format message may convey an indication of whether base station 105-a is requesting a channel information that include phase noise corrected channel measurements, non-phase noise corrected channel measurements, or both channel measurements. The channel reporting format message may be transmitted on a PDCCH. Base station 105-a may reserve bit(s) on a DCI to convey the indication of the format indicator for the channel information message.

UE 115-a may receive the channel reporting format message that includes the format indicator for the channel information message. UE 115-a may receive the channel reporting format message via one or more of directional beams 205. UE 115-a may receive the channel reporting message on the PDCCH. UE 115-a may decode bit(s) in a DCI that conveys the indication of the format indicator for the channel information message. The format indicator may indicate that base station 105-a is requesting phase noise corrected channel measurements, non-phase noise corrected channel measurements, or both channel measurements.

Base station 105-a may transmit, to UE 115-a during a symbol period, a PC-RS and a CSI-RS. UE 115-a may use the PC-RS and CSI-RS to identify first channel information and transmit a channel information message to base station 105-a that includes the first channel information. UE 115-a may identify a channel measurements using the CSI-RS and identify a phase noise correction factor using the PC-RS. The channel measurement may include a measurements of the pathloss, received signal strength, etc., associated with the communication path between UE 115-a and base station 105-a. The channel measurement may be associated with an antenna port, a beamform indicator, etc. The phase noise correction factor may indicate the amount of phase noise measured in the received PC-RS. The measured phase noise may be generated by the communication path between UE 115-a and base station 105-a, by internal components of base station 105-a and/or UE 115-a, or combinations thereof. UE 115-a may use these channel measurements to identify the first channel information that may include a phase noise corrected channel measurement.

In some examples, UE 115-a may use the CSI-RS to identify a second channel information. For example, UE 115-a may identify a channel measurement using the CSI-RS that is a non-phase noise corrected channel measurement. The second channel information may be included in the channel information message transmitted to base station 105-a. Thus, UE 115-a may generate the channel information message that include first channel information and second channel information and transmit the generated channel information message to base station 105-a. The first channel information and/or the second channel information may include a CQI, a RI, a PMI, a beam indicator, or combinations of such information. In some examples, the first channel information may include a phase noise corrected CQI, a phase noise corrected RI, a phase noise corrected PMI, a phase noise corrected beam indicator, or combinations of such information. In some examples, the second channel information may include a non-phase noise corrected CQI, a non-phase noise corrected RI, a non-phase noise corrected PMI, a non-phase noise corrected beam indicator, or combinations of such information.

The channel information message may be transmitted to base station 105-a on a physical uplink control channel (PUCCH). The channel information message may be transmitted in a RACH subframe. The channel information message may be transmitted in an uplink control information (UCI) of a physical uplink shared channel (PUSCH).

Base station 105-*a* may receive the channel information message transmitted from UE 115-*a*. The channel information message may include the first channel information, the second channel information, or both the first and second channel information. Base station 105-*a* may use the channel information included in the channel information message to determine various communications parameters, e.g., resource assignment, MCS selection, etc.

Moreover, base station 105-*a* may use the information to determine subsequent channel performance and feedback reporting steps. For example, base station 105-*a* may use the channel information to determine the amount of phase noise associated with communications with UE 115-*a*. Base station 105-*a* may modify the number of PC-RSs transmitted in a subframe, the tones or frequencies that the PC-RSs are transmitted in during the subframe, etc., based on the channel information received in the channel information message.

A UE 115-*b* may jointly estimate a channel and phase noise in the presence of CSI-RSs. The combined use of CSI-RSs and PC-RSs may allow a UE 115-*b* to estimate channels for different antenna ports (e.g., antenna ports associated with individual beams 205), in addition to phase noise variation both within a symbol and across multiple symbols.

PC-RSs may be used to estimate phase noise variation. PC-RSs may be in the middle of DM-RS symbols and/or physical downlink shared channel (PDSCH) tones. The PC-RS may additionally or alternatively be transmitted during the same symbol period as a CSI-RS. In the presence of phase noise, the UE 115-*b* may look at PC-RSs to extract phase noise. The extracted phase noise may then be used to estimate the channel throughout the entire symbol. The phase noise may be directly estimated in the frequency domain.

Null tones may be used to estimate phase noise variation. Noise from neighboring tones may be nullified or reduced with the use of null tones. UE 115-*b* may determine how much leakage occurred from a PC-RS tone to a neighboring null tone. The leakage may be used to additionally or alternatively determine how much CSI-RSs leak from one tone to another. Using the information associated with leakage between CSI-RSs, the UE 115-*b* can find proper CSI for different antenna ports. That is, null tones may reduce the severity to which CSI-RSs experience effects from leakage (e.g., noise) of neighboring CSI-RSs in the frequency domain, resulting in reception of more accurate CSI at UE 115-*b*. Null tones may be adjacent to PC-RSs or, in some cases, interleaved with CSI-RSs (e.g., according to a null tone frequency periodicity).

CSI-RSs and a set of null tones may be repeated to estimate phase noise variation. Additionally or alternatively, UE 115-*b* may generate a channel estimate based on the determined phase noise estimate and the CSI-RS tones. Base station 105-*b* may repeat the same CSI-RS multiple times within a symbol. UE 115-*b* may then identify phase noise for each portion of the CSI-RS repetition (e.g., each individual CSI-RS of the repeated sequence), and identify phase noise variation across the CSI-RS portions. If the CSI-RS symbols are interleaved (e.g., null tone between every two CSI-RS tones) the UE 115-*b* may see the signal repeated twice in the time domain upon taking a fast Fourier transform (FFT) of the signal. UE 115-*b* may then observe the phase at each instance of the repeated signal to determine phase variation within the symbol (e.g., UE can identify phase noise variation across the two copies). For example, CSI-RSs may be transmitted after every two subcarriers resulting in a time domain periodicity of 2048/2=1024 tones. The UE 115-*b* may then receive two periods of a time domain sequence of CSI-RSs, where each period has been multiplied with different phase noise. A time periodicity may additionally or alternatively be identified from the repeated signal. UE 115-*b* may then estimate phase noise based on this periodicity. The obtained phase noise may be used to estimate channel state information.

Base station 105-*b* may repeat CSI-RSs multiple times with different interleaving patterns to estimate phase noise at a higher granularity. That is, CSI-RSs patterns may be repeated with different periodicities to estimate phase noise with higher precision. As the number of null tones between two reference signals are increased, the number of signals repeated in the time domain may additionally or alternatively be increased. The phase variation may then be estimated based on phase information of the increased number of copies, resulting in phase variation estimates of higher granularity. However, increasing the number of null tones between CSI-RSs increases the distance between CSI-RSs and may result in reduced channel estimation accuracy.

Figure 3A:
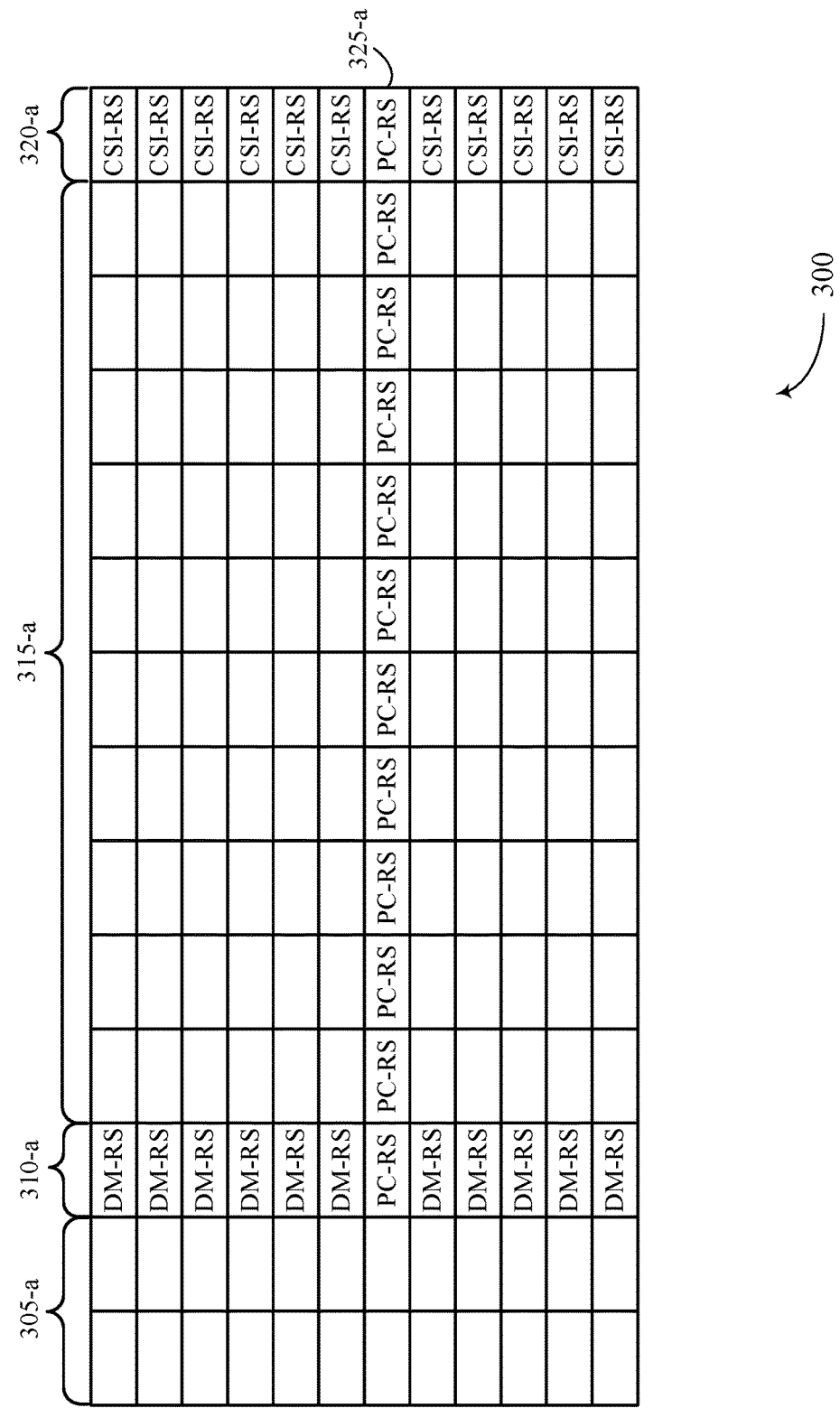
FIG. 3A illustrates an example of a subframe that supports channel information reporting in accordance with aspects of the present disclosure.

FIG. 3A illustrates an example of a subframe 300 in a system that supports channel information reporting, in accordance with various aspects of the present disclosure. In some aspects, subframe 300 may represent aspects of techniques performed by a UE 115 or base station 105 as described with reference to FIGS. 1-2. Broadly, subframe 300 may illustrate an example of the transmission of a PC-RS and CSI-RS in the same symbol period of subframe 300 to be used for channel measurements and reporting.

The horizontal rows of subframe 300 may indicate different frequencies, tones, bins, subcarriers, etc., being used for transmissions during the subframe 300. The vertical columns of subframe 300 may indicate different symbols of the subframe 300. Each intersection of subcarrier and symbol may be referred to as a resource element, in some examples. Subframe 300 may include multiple symbols and subcarriers used by a UE 115 for the transmission and/or reception of various signals. In some cases, subframe 300 may include different radio frequency/symbol regions, where each region may include multiple subcarriers and/or symbols. In some cases, these regions may be associated with different types of transmissions.

For example, a first region 305-*a* may be associated with PDCCH transmissions. The PDCCH transmissions may include channel format indicator message transmissions from a base station 105 to a UE 115. In the example subframe 300, the first region 305-*a* may occupy two symbol periods of the subframe 300. A second region 310-*a* may be used for DM-RS transmissions. In the example subframe 300, the DM-RS transmissions in region 310-*a* may be based on a single antenna port transmission. In the example subframe 300, the second region 310-*a* may occupy one symbol period of the subframe 300.

A third region 315-*a* may be used for PDSCH transmissions that may include data being transmitted to UE 115. In the example subframe 300, the third region 315-*a* may occupy ten symbol periods of the subframe 300. A fourth region 320-*a* may be used for CSI-RS transmission from base station 105 to UE 115. In the example subframe 300, the CSI-RS may be based on a single antenna port transmission. In the example subframe 300, the fourth region 320-*a* may occupy one symbol period of the subframe 300.

Subframe 300 may include a plurality of PC-RSs 325-a (only one PC-RS being labeled for ease of reference) may be transmitted during (or populated within) the second region 310-a, the third region 315-a, and the fourth region 320-a. Thus, PC-RSs 325-a may occupy a plurality of symbol periods of subframe 300. The PC-RSs 325-a may be transmitted in the same symbol period as the CSI-RS transmissions, e.g., during the fourth region 320-a. The PC-RSs 325-a may be transmitted in subframe 300 using a single subcarrier across the different regions. This may support phase noise correction factor identification during each symbol of subframe 300. The PC-RSs 325-a may be transmitted according to the example subframe 300 based on a determination (e.g., based on previous phase noise detection events) that phase noise is above a threshold and that the phase noise is varying below a second threshold during a symbol period of subframe. Thus, the PC-RSs 325-a may be used to identify a phase noise correction factor associated with communications between a base station 105 and a UE 115, such as is described with reference to FIGS. 1 and/or 2.

Figure 3B:
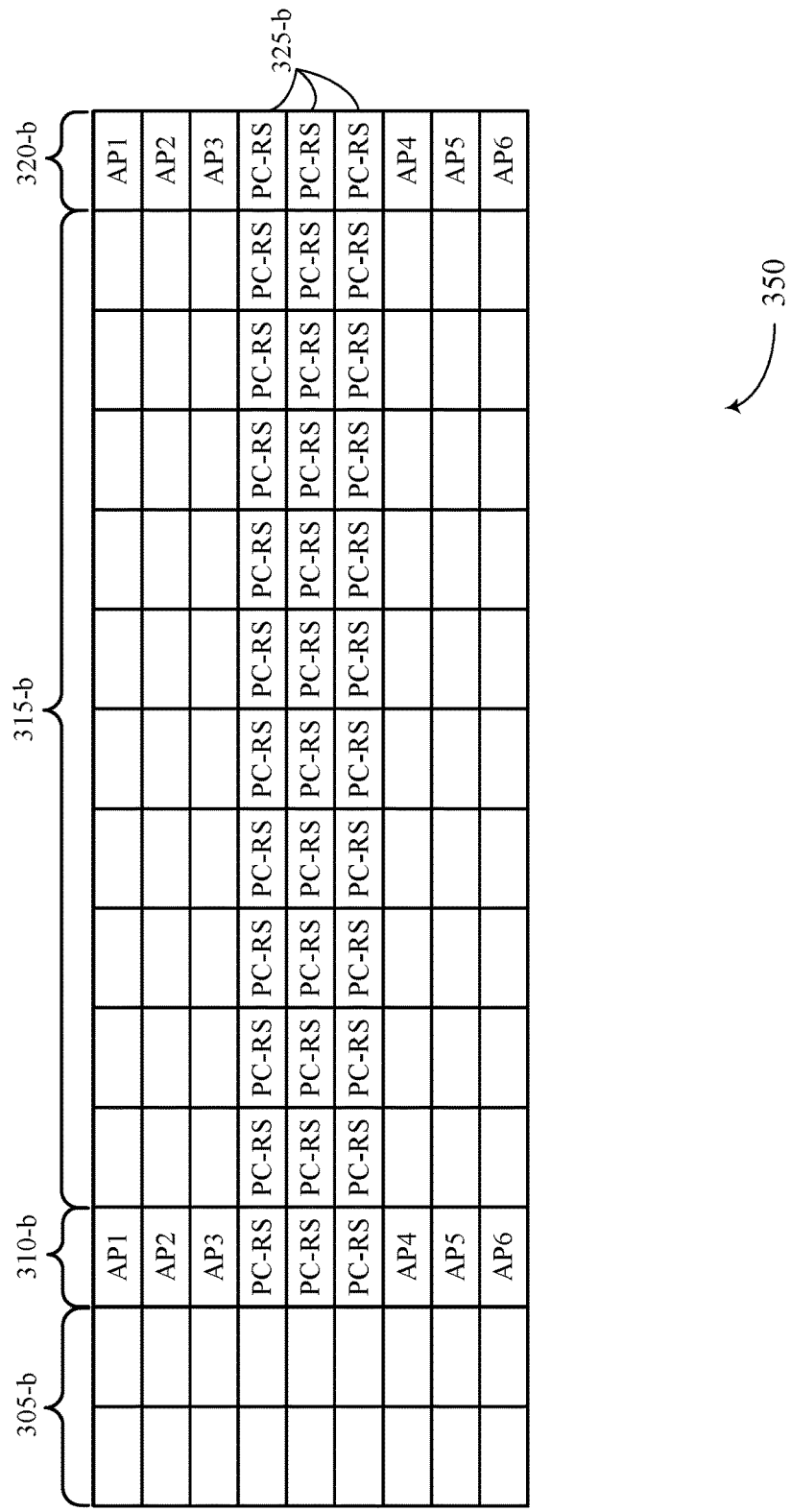
FIG. 3B illustrates an example of a subframe that supports channel information reporting in accordance with aspects of the present disclosure.

FIG. 3B illustrates an example of a subframe 350 in a system that supports channel information reporting, in accordance with various aspects of the present disclosure. In some aspects, subframe 350 may represent aspects of techniques performed by a UE 115 or base station 105 as described with reference to FIGS. 1-2. Broadly, subframe 350 may illustrate an example of the transmission of a PC-RS and CSI-RS in the same symbol period of subframe 350 to be used for channel measurements and reporting.

The horizontal rows of subframe 350 may indicate different frequencies, tones, bins, subcarriers, etc., being used for transmissions during the subframe 350. The vertical columns of subframe 350 may indicate different symbols of the subframe 350. Each intersection of subcarrier and symbol may be referred to as a resource element, in some examples. Subframe 350 may include multiple symbols and subcarriers used by a UE 115 for the transmission and/or reception of various signals. In some cases, subframe 350 may include different radio frequency/symbol regions, where each region may include multiple subcarriers and/or symbols. In some cases, these regions may be associated with different types of transmissions.

For example, a first region 305-b may be associated with PDCCH transmissions. The PDCCH transmissions may include channel format indicator message transmissions from a base station 105 to a UE 115. In the example subframe 350, the first region 305-b may occupy two symbol periods of the subframe 350. A second region 310-b may be used for DM-RS transmissions. In the example subframe 350, the DM-RS transmissions in region 310-b may be based on multiple antenna port transmissions. For example, the DM-RS transmissions in the second region 310-b may include transmissions from antenna port 1 (AP1), antenna port 2 (AP2), antenna port 3 (AP3), antenna port 4 (AP4), antenna port 5 (AP5), and antenna port 6 (AP6). In the example subframe 350, the second region 310-b may occupy one symbol period of the subframe 350.

A third region 315-b may be used for PDSCH transmissions that may include data being transmitted to UE 115. In the example subframe 350, the third region 315-b may occupy ten symbol periods of the subframe 350. A fourth region 320-b may be used for CSI-RS transmission from base station 105 to UE 115. In the example subframe 350, the CSI-RS may be based on multiple antenna port transmissions. For example, the CSI-RS transmissions in the fourth region 320-b may include transmissions from AP1-AP6 of the base station 105. In the example subframe 350, the fourth region 320-b may occupy one symbol period of the subframe 350.

Subframe 350 may include a plurality of PC-RSs 325-b (only three PC-RSs being labeled for ease of reference) may be transmitted during (or populated within) the second region 310-b, the third region 315-b, and the fourth region 320-b. Thus, PC-RSs 325-b may occupy a plurality of symbol periods and a plurality of subcarriers of subframe 350. In the example subframe 350, the PC-RSs 325-b are transmitted on three subcarriers of the subframe 350 and during twelve symbol periods of the subframe 350. Thus, the PC-RSs 325-b may be transmitted in subframe 350 using three subcarriers across the different regions. This may support phase noise correction factor identification during each symbol of subframe 350. The PC-RSs 325-b may be transmitted according to the example subframe 350 based on a determination (e.g., based on previous phase noise detection events) that the phase noise is above a threshold level and that the phase noise is varying above a second threshold during a symbol period of a subframe. Thus, the PC-RSs 325-b may be used to identify a phase noise correction factor associated with communications between a base station 105 and a UE 115, such as is described with reference to FIGS. 1 and/or 2.

Figure 3C:
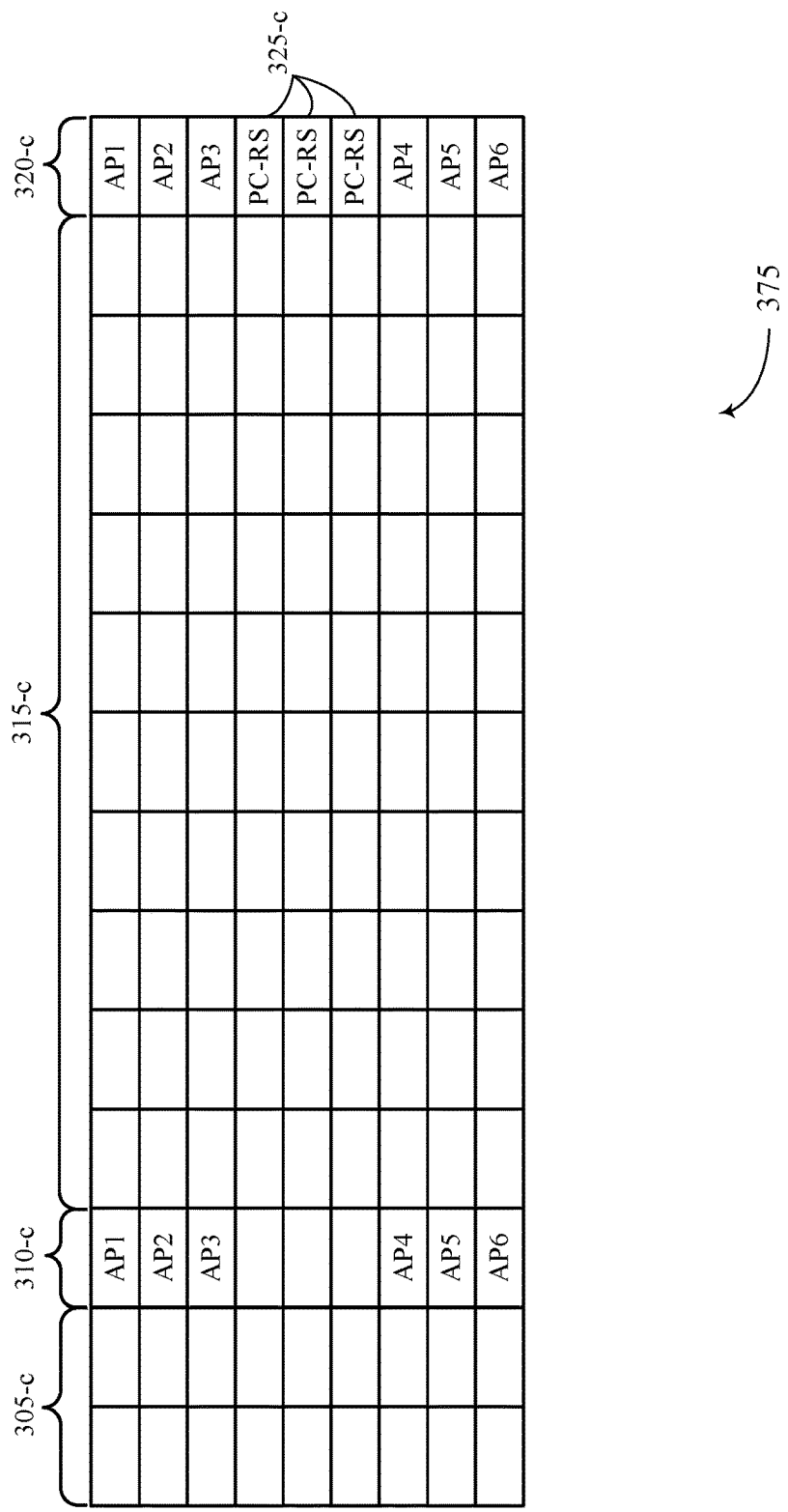
FIG. 3C illustrates an example of a subframe that supports channel information reporting in accordance with aspects of the present disclosure.

FIG. 3C illustrates an example of a subframe 375 in a system that supports channel information reporting, in accordance with various aspects of the present disclosure. In some aspects, subframe 375 may represent aspects of techniques performed by a UE 115 or base station 105 as described with reference to FIGS. 1-2. Broadly, subframe 375 may illustrate an example of the transmission of a PC-RS and CSI-RS in the same symbol period of subframe 375 to be used for channel measurements and reporting.

The horizontal rows of subframe 375 may indicate different frequencies, tones, bins, subcarriers, etc., being used for transmissions during the subframe 375. The vertical columns of subframe 375 may indicate different symbols of the subframe 375. Each intersection of subcarrier and symbol may be referred to as a resource element, in some examples. Subframe 375 may include multiple symbols and subcarriers used by a UE 115 for the transmission and/or reception of various signals. In some cases, subframe 375 may include different radio frequency/symbol regions, where each region may include multiple subcarriers and/or symbols. In some cases, these regions may be associated with different types of transmissions.

For example, a first region 305-c may be associated with PDCCH transmissions. The PDCCH transmissions may include channel format indicator message transmissions from a base station 105 to a UE 115. In the example subframe 375, the first region 305-c may occupy two symbol periods of the subframe 375. A second region 310-c may be used for DM-RS transmissions. In the example subframe 375, the DM-RS transmissions in region 310-c may be based on multiple antenna port transmissions. For example, the DM-RS transmissions in the second region 310-c may include transmissions from AP1-AP6. In the example subframe 375, the second region 310-c may occupy one symbol period of the subframe 375.

A third region 315-c may be used for PDSCH transmissions that may include data being transmitted to UE 115. In the example subframe 375, the third region 315-c may occupy ten symbol periods of the subframe 375. A fourth region 320-c may be used for CSI-RS transmission from base station 105 to UE 115. In the example subframe 375, the CSI-RS may be based on multiple antenna port transmissions. For example, the CSI-RS transmissions in the fourth region 320-c may include transmissions from AP1-AP6 of the base station 105. In the example subframe 375, the fourth region 320-c may occupy one symbol period of the subframe 375.

Subframe 375 may include a plurality of PC-RSs 325-c (only three PC-RSs being labeled for ease of reference) may be transmitted during (or populated within) the fourth region 320-c. Thus, PC-RSs 325-c may occupy a symbol period and a plurality of subcarriers of subframe 375. In the example subframe 375, the PC-RSs 325-c are transmitted on three subcarriers of the subframe 375 and during three symbol periods of the fourth region 320-c. This may support phase noise correction factor identification during the symbol period of subframe 375. The PC-RSs 325-c may be transmitted according to the example subframe 375 based on a determination (e.g., based on previous phase noise detection events) that phase noise are below a threshold level in the subframe. In some examples, PC-RSs 325-c may be present in the same symbol period as CSI-RS, but may be absent in PDSCH transmissions during the second region 310-c and/or the third region 315-c. The UE 115 and the base station 105 may determine or identify that PC-RSs 325-c are not necessary during PDSCH for different reasons, e.g., due to low modulation rate, a low rank, a higher capability at UE, etc. Thus, the PC-RSs 325-c may be used to identify a phase noise correction factor associated with communications between a base station 105 and a UE 115, such as is described with reference to FIGS. 1 and/or 2.

Figure 4A:
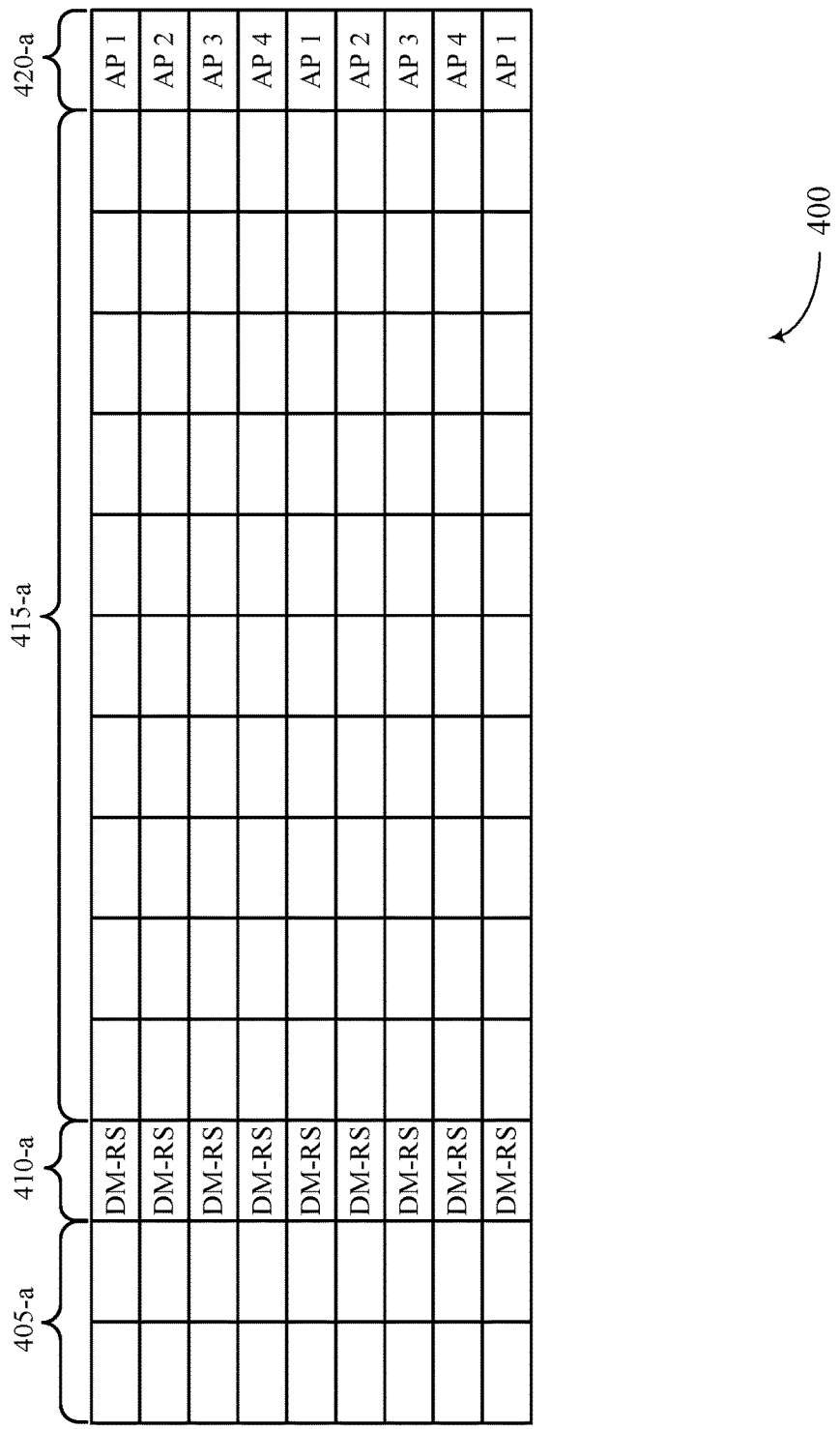

FIG. 4A illustrates an example of a subframe 400 for CSI estimation with phase noise. In some cases, subframe 400 may represent aspects of techniques performed by a UE 115 or base station 105 as described with reference to FIGS. 1-2. Subframe 400 may illustrate an example of the transmission of CSI-RS in the same symbol period of subframe 400 to be used for channel measurements.

The horizontal rows of subframe 400 may indicate different frequencies, tones, bins, subcarriers, etc., being used for transmissions during the subframe 400. The vertical columns of subframe 400 may indicate different symbols of the subframe 400. Each intersection of subcarrier and symbol may be referred to as a resource element, in some examples. Subframe 400 may include multiple symbols and subcarriers used by a UE 115 for the transmission and/or reception of various signals. In some cases, subframe 400 may include different radio frequency/symbol regions, where each region my include multiple subcarriers and/or symbols. In some cases, these regions may be associated with different types of transmissions.

For example, a first region 405-a may be associated with PDCCH transmissions. The PDCCH transmissions may include channel format indicator message transmissions from a base station 105 to a UE 115. In the example subframe 400, the first region 405-a may occupy two symbol periods of the subframe 400. A second region 410-a may be used for DM-RS transmissions. In the example subframe 400, the second region 410-a may occupy one symbol period of the subframe 400.

A third region 415-a may be used for PDSCH transmissions that may include data being transmitted to UE 115. In the example subframe 400, the third region 415-a may occupy ten symbol periods of the subframe 400. A fourth region 420-a may be used for CSI-RS transmission from base station 105 to UE 115. Each CSI-RS tone may be associated with a transmission from different antenna ports of the base station 105. In the example subframe 400, CSI-RS tones may correspond to one of four base station 105 antenna ports. For example, the CSI-RS transmissions in the fourth region 420-a may include transmissions from antenna port 1 (AP1), antenna port 2 (AP2), antenna port 3 (AP3), and antenna port 4 (AP4). In the example subframe 400, the fourth region 420-a may occupy one symbol period at the end of subframe 400.

Figure 4B:
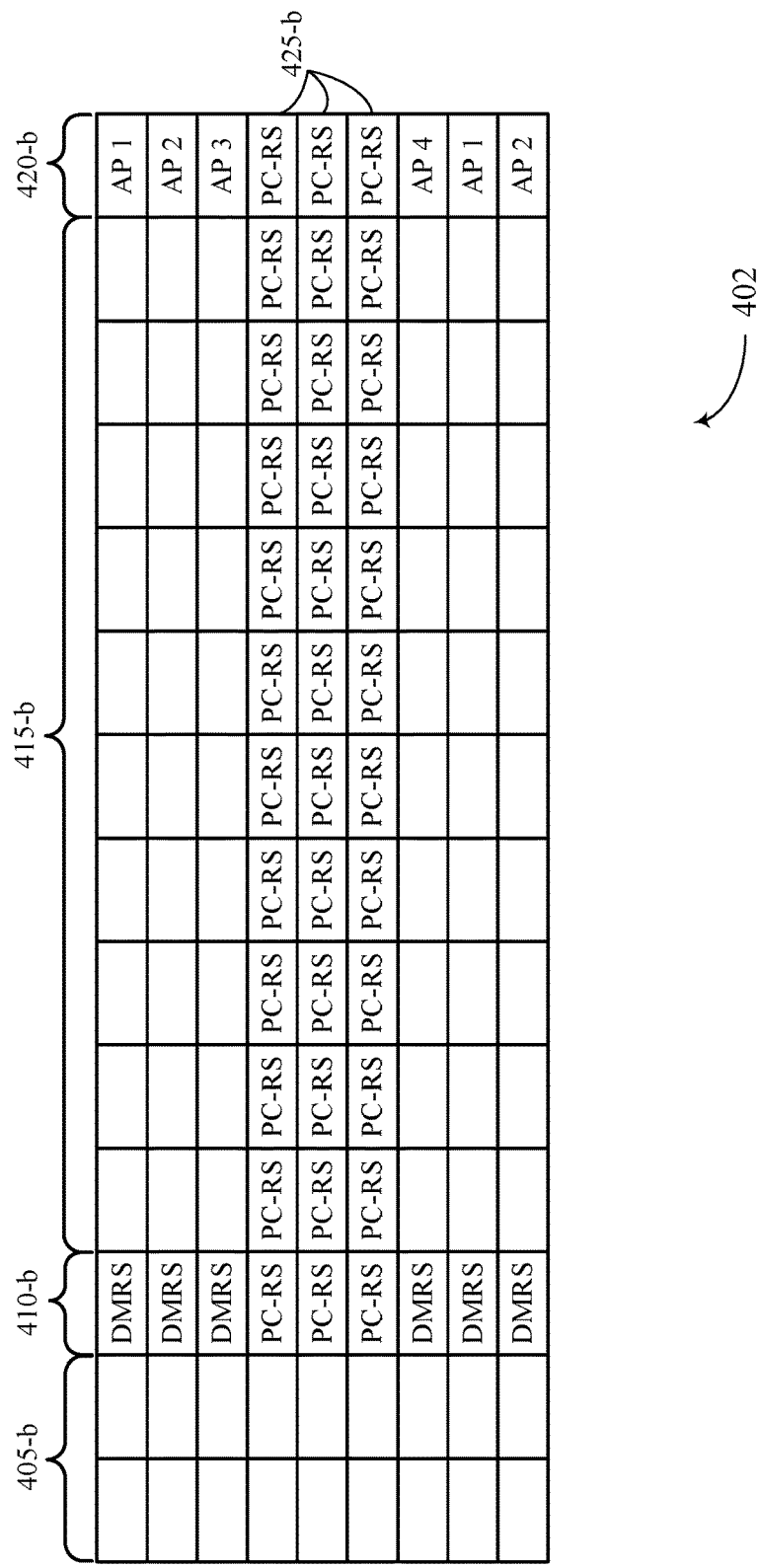

FIG. 4B illustrates an example of a subframe 402 for CSI estimation with phase noise. In some cases, subframe 402 may represent aspects of techniques performed by a UE 115 or base station 105 as described with reference to FIGS. 1-2. Subframe 402 may illustrate an example of the transmission of a PC-RS and CSI-RS in the same symbol period of subframe 402 to be used for channel measurements, in addition to estimation of phase noise variation.

The horizontal rows of subframe 402 may indicate different frequencies, tones, bins, subcarriers, etc., being used for transmissions during the subframe 402. The vertical columns of subframe 402 may indicate different symbols of the subframe 402. In some examples, each intersection of a subcarrier and symbol may be referred to as a resource element. Subframe 402 may include multiple symbols and subcarriers used by a UE 115 for the transmission and/or reception of various signals. In some cases, subframe 402 may include different radio frequency/symbol regions, where each region may include multiple subcarriers and/or symbols. In some cases, these regions may be associated with different types of transmissions.

For example, a first region 405-b may be associated with PDCCH transmissions. The PDCCH transmissions may include channel format indicator message transmissions from a base station 105 to a UE 115. In the example subframe 402, the first region 405-b may occupy two symbol periods of the subframe 402. A second region 410-b may be generally used for DM-RS transmissions. In the example subframe 402, the second region 410-b may occupy one symbol period of the subframe 402.

A third region 415-b may be used for PDSCH transmissions that may include data being transmitted to UE 115. In the example subframe 402, the third region 415-b may occupy ten symbol periods of the subframe 402. A fourth region 420-b may be used for CSI-RS transmission from base station 105 to UE 115. In the example subframe 402, the CSI-RS may be based on multiple antenna port transmissions. For example, the CSI-RS transmissions in the fourth region 420-b may include transmissions from AP1-AP4 of the base station 105. In the example subframe 402, the fourth region 420-b may occupy one symbol period at the end of subframe 402.

Subframe 402 may include a plurality of PC-RSs 425-b (only three PC-RSs being labeled for ease of reference) may be transmitted during (or populated within) the second region 410-b, the third region 415-b, and the fourth region 420-b. Thus, PC-RSs 425-b may occupy a plurality of symbol periods and a plurality of subcarriers of subframe 402. In the example subframe 402, the PC-RSs 425-b are transmitted on three subcarriers of the subframe 402 and during twelve symbol periods of the subframe 402. Thus, the PC-RSs 425-b may be transmitted in subframe 402 using three subcarriers across the different regions. This may support phase noise correction factor identification during each symbol of subframe 402. The PC-RSs 425-b may be transmitted according to the example subframe 402 based on a determination of whether the phase noise is above or below a threshold level or whether phase noise variance is above or below a threshold (e.g., based on previous phase noise detection events). Thus, the PC-RSs 425-b may be used to identify a phase noise correction factor associated with communications between a base station 105 and a UE 115, such as is described with reference to FIGS. 1 and/or 2.

FIG. 4C illustrates an example of a subframe 450 for CSI estimation with phase noise. In some cases, subframe 450 may represent aspects of techniques performed by a UE 115 or base station 105 as described with reference to FIGS. 1-2. Subframe 450 may illustrate an example of the transmission of a PC-RS and CSI-RS in the same symbol period of subframe 450 with the use of null tones for estimating phase noise variation.

The horizontal rows of subframe 450 may indicate different frequencies, tones, bins, subcarriers, etc., being used for transmissions during the subframe 450. The vertical columns of subframe 450 may indicate different symbols of the subframe 450. Each intersection of subcarrier and symbol may be referred to as a resource element, in some examples. Subframe 450 may include multiple symbols and subcarriers used by a UE 115 for the transmission and/or reception of various signals. In some cases, subframe 450 may include different radio frequency/symbol regions, where each region my include multiple subcarriers and/or symbols. In some cases, these regions may be associated with different types of transmissions.

For example, a first region 405-c may be associated with PDCCH transmissions. The PDCCH transmissions may include channel format indicator message transmissions from a base station 105 to a UE 115. In the example subframe 450, the first region 405-c may occupy two symbol periods of the subframe 450. A second region 410-c may be generally used for DM-RS transmissions. In the example subframe 450, the second region 410-c may occupy one symbol period of the subframe 450.

A third region 415-c may be used for PDSCH transmissions that may include data being transmitted to UE 115. In the example subframe 450, the third region 415-c may occupy ten symbol periods of the subframe 450. A fourth region 420-c may be used for CSI-RS transmission from base station 105 to UE 115. In the example subframe 450, the CSI-RS may be based on multiple antenna port transmissions. For example, the CSI-RS transmissions in the fourth region 420-c may include transmissions from AP1-AP4 of the base station 105. In the example subframe 450, the fourth region 420-c may occupy one symbol period at the end of subframe 450.

Subframe 450 may additionally or alternatively include a plurality of PC-RSs 425-c and null tones 430-c (only one PC-RS and one null tone being labeled for ease of reference) which may be transmitted during (or populated within) the second region 410-c, the third region 415-c, and the fourth region 420-c. Thus, PC-RSs 425-c and null tones 430-c may occupy a plurality of symbol periods and a plurality of subcarriers of subframe 450. In the example subframe 450, the PC-RSs 425-c are transmitted on one subcarrier (e.g., subcarrier 435-e) of the subframe 450 for twelve symbol periods. Null tones 430-c may be transmitted on adjacent subcarriers (e.g., subcarrier 435-e and subcarrier 435-f) of the subframe 450 for the same twelve symbol periods. That is, the PC-RSs 425-c may be surrounded by null tones in the frequency domain. Thus, the PC-RSs 425-c and null tones 430-c may be transmitted in subframe 450 using three subcarriers across the different regions. This may support estimation of phase noise variation across each symbol of subframe 450.

Figure 4D:
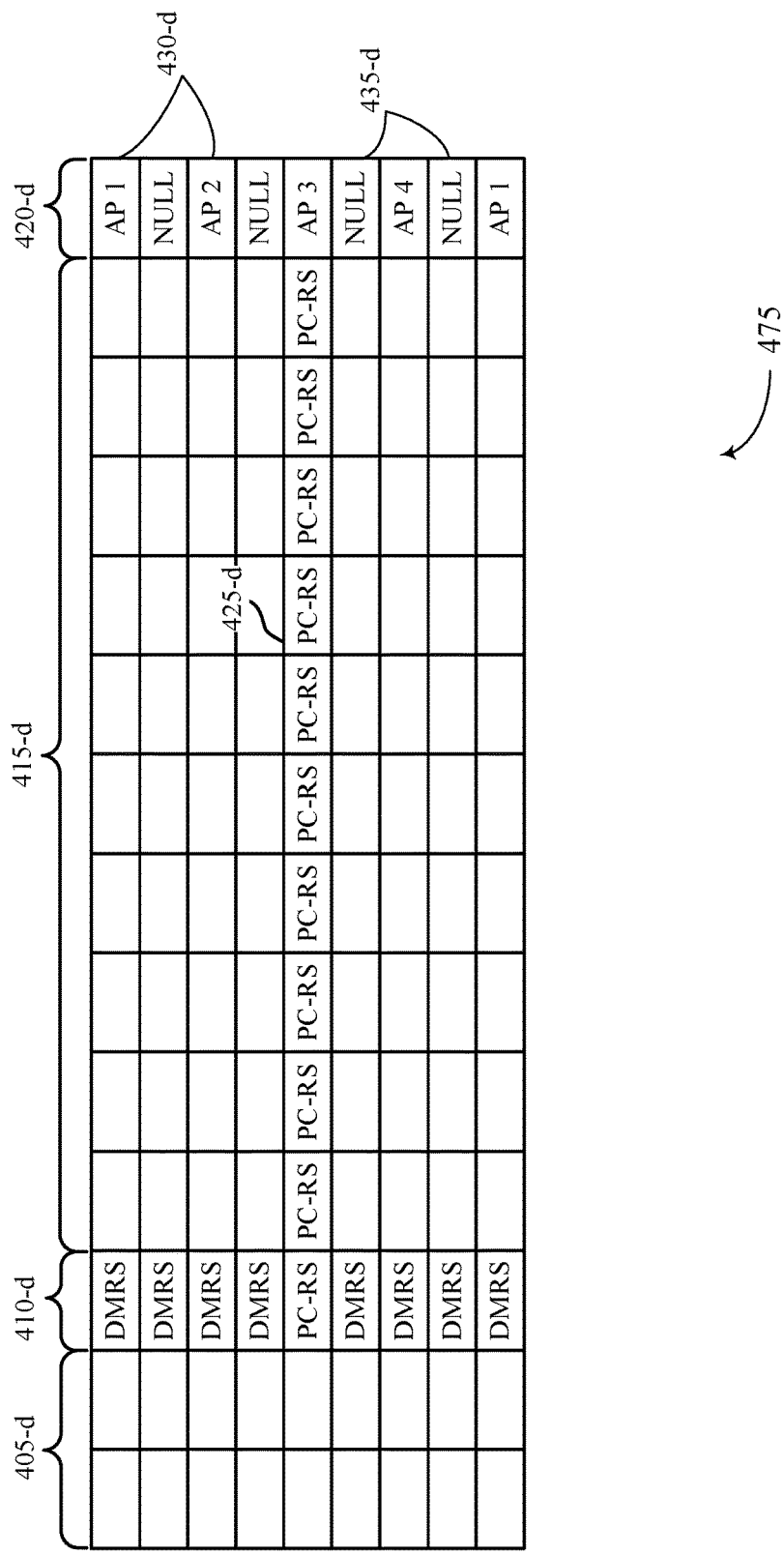

FIG. 4D illustrates an example of a subframe 475 for CSI estimation with phase noise. In some cases, subframe 475 may represent aspects of techniques performed by a UE 115 or base station 105 as described with reference to FIGS. 1-2. Subframe 475 may illustrate an example of the transmission of a PC-RS 425-d, as well as CSI-RS 430-d and null tones 435-d, which may be transmitted in the same symbol period of subframe 475 for channel measurements and estimation of phase noise variation.

The horizontal rows of subframe 475 may indicate different frequencies, tones, bins, subcarriers, etc., being used for transmissions during the subframe 475. The vertical columns of subframe 475 may indicate different symbols of the subframe 475. Each intersection of subcarrier and symbol may be referred to as a resource element, in some examples. Subframe 475 may include multiple symbols and subcarriers used by a UE 115 for the transmission and/or reception of various signals. In some cases, subframe 475 may include different radio frequency/symbol regions, where each region may include multiple subcarriers and/or symbols. In some cases, these regions may be associated with different types of transmissions.

For example, a first region 405-d may be associated with PDCCH transmissions. The PDCCH transmissions may include channel format indicator message transmissions from a base station 105 to a UE 115. In the example subframe 475, the first region 405-d may occupy two symbol periods of the subframe 475. A second region 410-d may be generally used for DM-RS transmissions. In the example subframe 475, the second region 410-d may occupy one symbol period of the subframe 475.

A third region 415-d may be used for PDSCH transmissions that may include data being transmitted to UE 115. In the example subframe 475, the third region 415-d may occupy ten symbol periods of the subframe 475. A fourth region 420-d may be used for CSI-RS transmission from base station 105 to UE 115. In the example subframe 475, the 430-d may be based on multiple antenna port transmissions. Null tones 435-d may be placed in every other subcarrier of the symbol. For example, the CSI-RS 430-d transmissions in the fourth region 420-d may include transmissions from AP1-AP4 of the base station 105. The CSI-RS 430-d may be transmitted in an interleaved manner such that a null tone 435-d is between every two CSI-RS 430-d resource elements. This interleaved CSI-RS 430-d transmission may result in the signal repeating itself twice in the time domain, allowing a UE 115 to track phase variation across the two copies associated with a single symbol. In the example subframe 475, the fourth region 420-d may occupy one symbol period at the end of subframe 475.

Subframe 475 may additionally or alternatively include a plurality of PC-RSs 425-d which may be transmitted during (or populated within) the second region 410-d and the third region 415-d. PC-RSs 425-d may occupy a plurality of symbol periods across a subcarrier of subframe 475. In the example subframe 475, the PC-RSs 425-d are transmitted on one subcarrier of the subframe 475 for eleven symbol periods.

Figure 5:
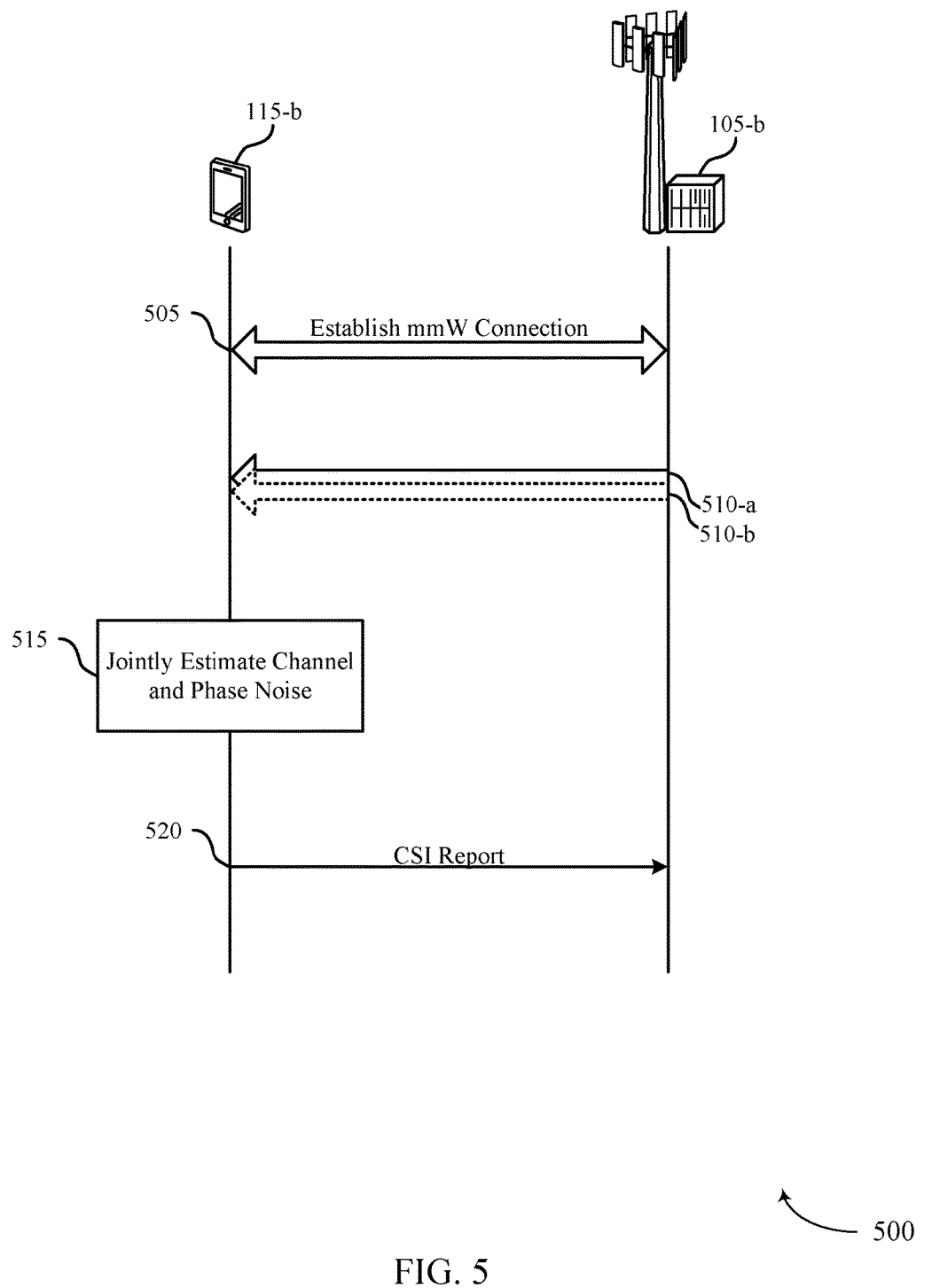
FIG. 5 illustrates an example of a process flow in a system that supports CSI estimation with phase noise in accordance with aspects of the present disclosure.

FIG. 5 illustrates an example of a process flow 500 for CSI estimation with phase noise in accordance with various aspects of the present disclosure. Process flow 500 may include base station 105-a and UE 115-a, which may be examples of the corresponding devices described with reference to FIG. 1-2.

At step 505, UE 115-b establishes a connection with base station 105-b in the mmW spectrum. At step 510-a, UE 115-b receives a CSI-RS from base station 105-b during a symbol period. The CSI-RS may be included in a periodic signal, where a CSI-RS tone is inserted every nth tone of the periodic signal.

Optionally, at step 510-b, UE 115-b may simultaneously receive a pilot tone during the same symbol period. The number of pilot tones may be adjusted based on a category of UE 115-b. The pilot tone may include a PC-RS. In some cases, the pilot tones may be surrounded in the frequency domain by null tones 435-d. In other cases, pilot tones (e.g., PC-RS signals) may be located adjacent to each other in the symbol period.

At step 515, UE 115-b may jointly estimate the channel and phase noise based on the CSI-RS received in step 510.

At step 520, UE 115-b transmits a channel information message to base station 105-b based on the channel estimate and phase noise estimate. The channel information message may include a channel estimation for at least one antenna port of base station 105-b.

Figure 6:
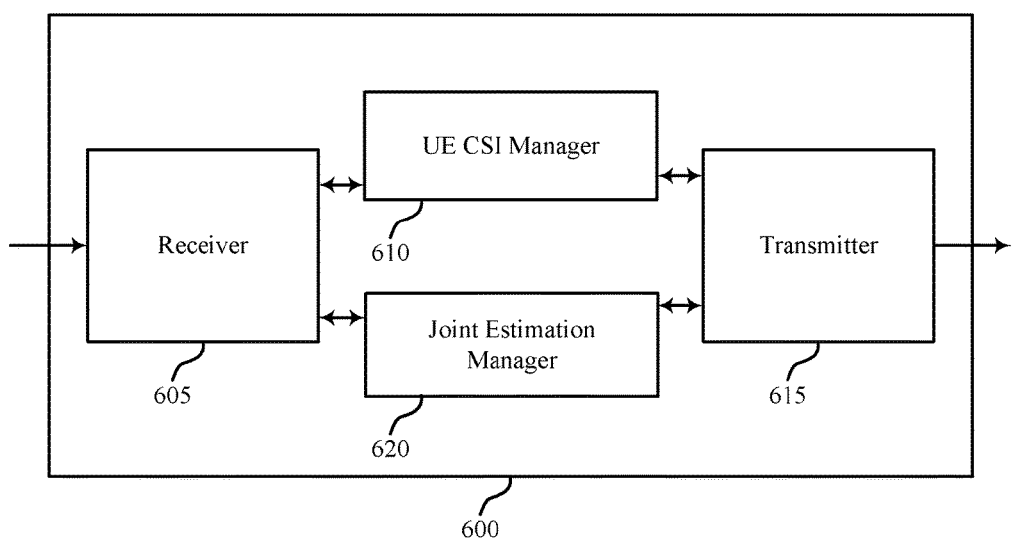
FIGS. 6 through 8B show block diagrams of a wireless device that supports channel information reporting and CSI estimation with phase noise in accordance with aspects of the present disclosure.

FIG. 6 shows a block diagram of a wireless device 600 that supports channel information reporting and CSI estimation with phase noise in accordance with various aspects of the present disclosure. Wireless device 600 may be an example of aspects of a UE 115 described with reference to FIGS. 1 through 5. Wireless device 600 may include a receiver 605, a UE CSI manager 610, a joint estimation manager 620 and a transmitter 615. Wireless device 600 may additionally or alternatively include a processor. Each of these components may be in communication with each other.

The receiver 605 may receive information such as packets, user data, or control information associated with various information channels (e.g., control channels, data channels, information related to channel information reporting, information related to CSI estimation with phase noise etc.). Information may be passed on to other components of the device. The receiver 605 may be an example of aspects of the transceiver 925 described with reference to FIG. 9.

The UE CSI manager 610 may receive, during a symbol period, at least one PC-RS and at least one CSI-RS, identify a first channel information based on both the CSI-RS and the PC-RS, and transmit a channel information message to a base station, the channel information message comprising the first channel information. The UE CSI manager 610 may additionally or alternatively be an example of aspects of the UE CSI manager 905 described with reference to FIG. 9.

The joint estimation manager 620 may receive at least one CSI-RS during a symbol period, generate a channel estimate and a phase noise estimate using a joint estimation based on the CSI-RS, and transmit a channel information message to a base station based on the channel estimate and the phase noise estimate. The joint estimation manager 620 may additionally or alternatively be an example of aspects of the joint estimation manager 940 described with reference to FIG. 9.

The transmitter 615 may transmit signals received from other components of wireless device 600. In some examples, the transmitter 615 may be collocated with a receiver in a transceiver module. For example, the transmitter 615 may be an example of aspects of the transceiver 925 described with reference to FIG. 9. The transmitter 615 may include a single antenna, or it may include a plurality of antennas.

Figure 7:
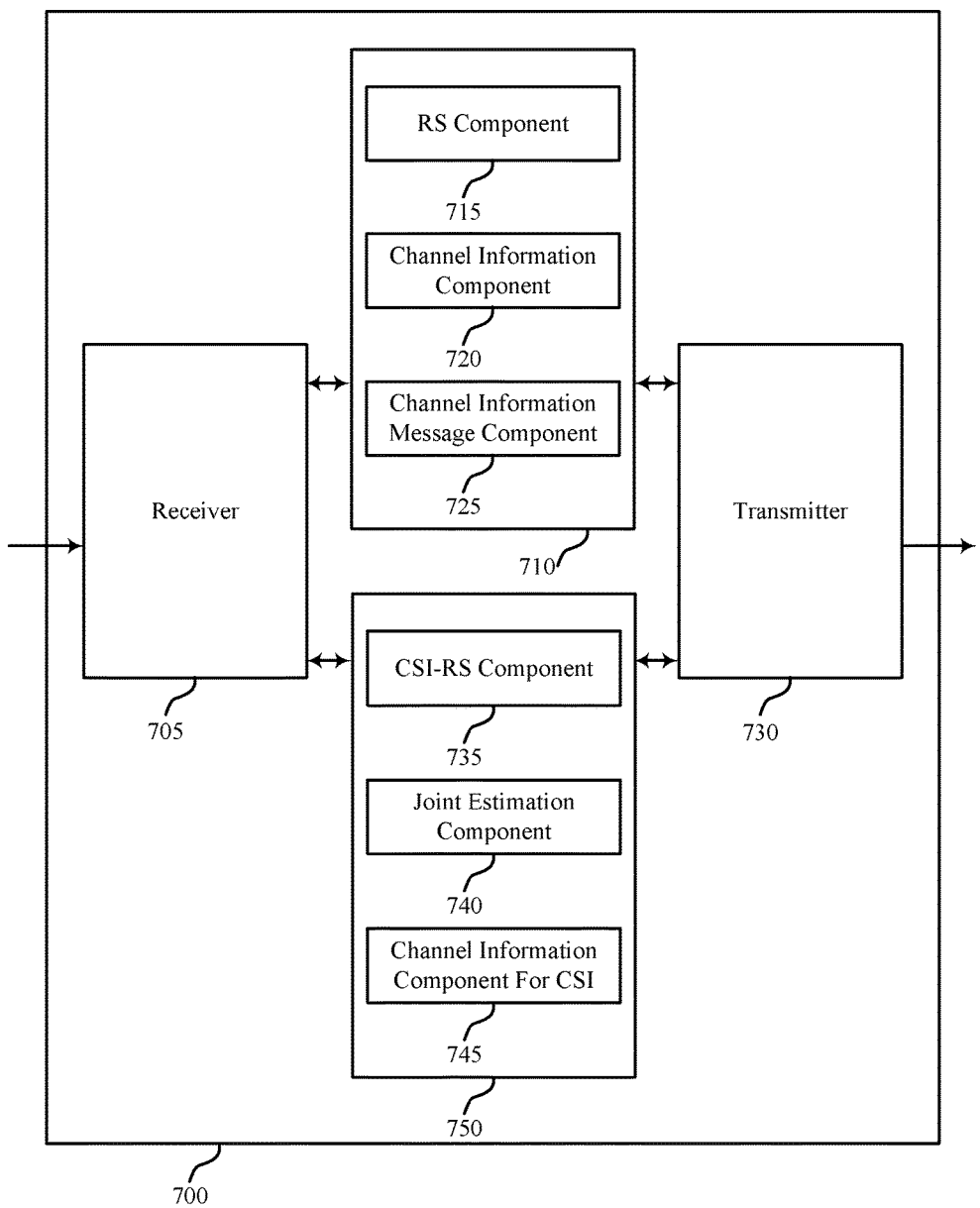

FIG. 7 shows a block diagram of a wireless device 700 that supports channel information reporting and CSI estimation with phase noise in accordance with various aspects of the present disclosure. Wireless device 700 may be an example of aspects of a wireless device 600 or a UE 115 described with reference to FIGS. 1 through 6. Wireless device 700 may include receiver 705, UE CSI manager 710, joint estimation manager 750, and transmitter 730. Wireless device 700 may additionally or alternatively include a processor. Each of these components may be in communication with each other.

The receiver 705 may receive information which may be passed on to other components of the device. The receiver 705 may additionally or alternatively perform the functions described with reference to the receiver 605 of FIG. 6. The receiver 705 may be an example of aspects of the transceiver 925 described with reference to FIG. 9.

The UE CSI manager 710 may be an example of aspects of UE CSI manager 610 described with reference to FIG. 6. The UE CSI manager 710 may include a RS component 715, a channel information component 720 and a channel information message component 725. The UE CSI manager 710 may be an example of aspects of the UE CSI manager 905 described with reference to FIG. 9.

The RS component 715 may receive, during a symbol period, at least one PC-RS and at least one CSI-RS. The channel information component 720 may identify a first channel information based on both the CSI-RS and the PC-RS, and identify a second channel information based on the CSI-RS. In some cases, the first channel information and the second channel information comprises at least one of a CQI, a rank indicator, a precoding matrix indicator, a beam indicator, or combinations thereof.

The channel information message component 725 may transmit the channel information message to the base station, the channel information message additionally or alternatively comprising the second channel information, generate the channel information message that comprises the first channel information and the second channel information, and transmit a channel information message to a base station, the channel information message comprising the first channel information. In some cases, the channel information message is transmitted on a physical uplink control channel (PUCCH). In some cases, the channel information message is transmitted in a random access channel (RACH) subframe. In some cases, the channel information message is transmitted in an uplink control information (UCI) of a physical uplink shared channel (PUSCH).

The joint estimation manager 750 may be an example of aspects of joint estimation manager 620 described with reference to FIG. 6. The joint estimation manager 750 may include CSI-RS component 735, joint estimation component 740 and channel information component for CSI 745. The joint estimation manager 750 may be an example of aspects of the joint estimation manager 940 described with reference to FIG. 9.

The CSI-RS component 735 may receive a periodic signal including at least one repetition of the CSI-RS, where the joint estimation is based on the periodic signal, and receive at least one CSI-RS during a symbol period. In some cases, the periodic signal in time domain is generated by inserting a CSI-RS tone in every n-th tone of the periodic signal and by inserting null values in other tones of the periodic signal. In some cases, the n is determined based on a category of a receiving device.

The joint estimation component 740 may generate a channel estimate and a phase noise estimate using a joint estimation based on the CSI-RS. In some cases, the channel estimate includes a channel estimation for each of a set of antenna ports. The channel information component for CSI 745 may transmit a channel information message to a base station based on the channel estimate and the phase noise estimate.

The transmitter 730 may transmit signals received from other components of wireless device 700. In some examples, the transmitter 730 may be collocated with a receiver in a transceiver module. For example, the transmitter 730 may be an example of aspects of the transceiver 925 described with reference to FIG. 9. The transmitter 730 may utilize a single antenna, or it may utilize a plurality of antennas.

Figure 8A:
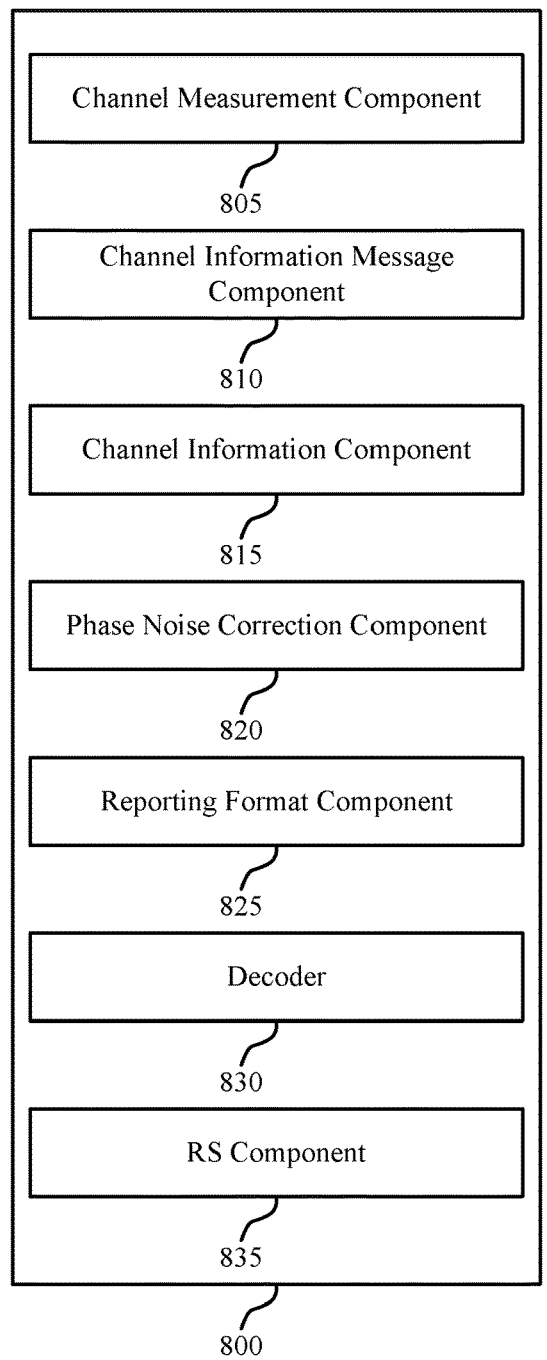

FIG. 8A shows a block diagram of a UE CSI manager 800 which may be an example of the corresponding component of wireless device 600 or wireless device 700. That is, UE CSI manager 800 may be an example of aspects of UE CSI manager 610 or UE CSI manager 710 described with reference to FIGS. 6 and 7. The UE CSI manager 800 may additionally or alternatively be an example of aspects of the UE CSI manager 905 described with reference to FIG. 9.

The UE CSI manager 800 may include a channel measurement component 805, a channel information message component 810, a channel information component 815, a phase noise correction component 820, a reporting format component 825, a decoder 830 and a RS component 835. Each of these modules may communicate, directly or indirectly, with one another (e.g., via one or more buses).

The channel measurement component 805 may identify a channel measurement based on the CSI-RS, the second channel information comprising a non-phase noise corrected channel measurement, and identify a channel measurement based on the CSI-RS.

The channel information message component 810 may transmit the channel information message to the base station, the channel information message additionally or alternatively comprising the second channel information, generate the channel information message that comprises the first channel information and the second channel information, and transmit a channel information message to a base station, the channel information message comprising the first channel information.

The channel information component 815 may identify a first channel information based on both the CSI-RS and the PC-RS, and identify a second channel information based on the CSI-RS. In some cases, the first channel information and the second channel information comprises at least one of a CQI, a rank indicator, a precoding matrix indicator, a beam indicator, or combinations thereof. The phase noise correction component 820 may identify a phase noise correction factor based on the PC-RS, the first channel information comprising a phase noise corrected channel measurement.

The reporting format component 825 may receive, from the base station, a channel reporting format message that comprises a format indicator for the channel information message. In some cases, the channel reporting format message is received on a PDCCH. In some cases, the format indicator comprises at least one of a request for the UE to report the first channel information or a request for the UE to report both the first channel information and the second channel information.

The decoder 830 may decode a one or more bits in a DCI that conveys the indication of the format indicator for the channel information message. The RS component 835 may receive, at a UE during a symbol period, at least one PC-RS and at least one CSI-RS.

Figure 8B:
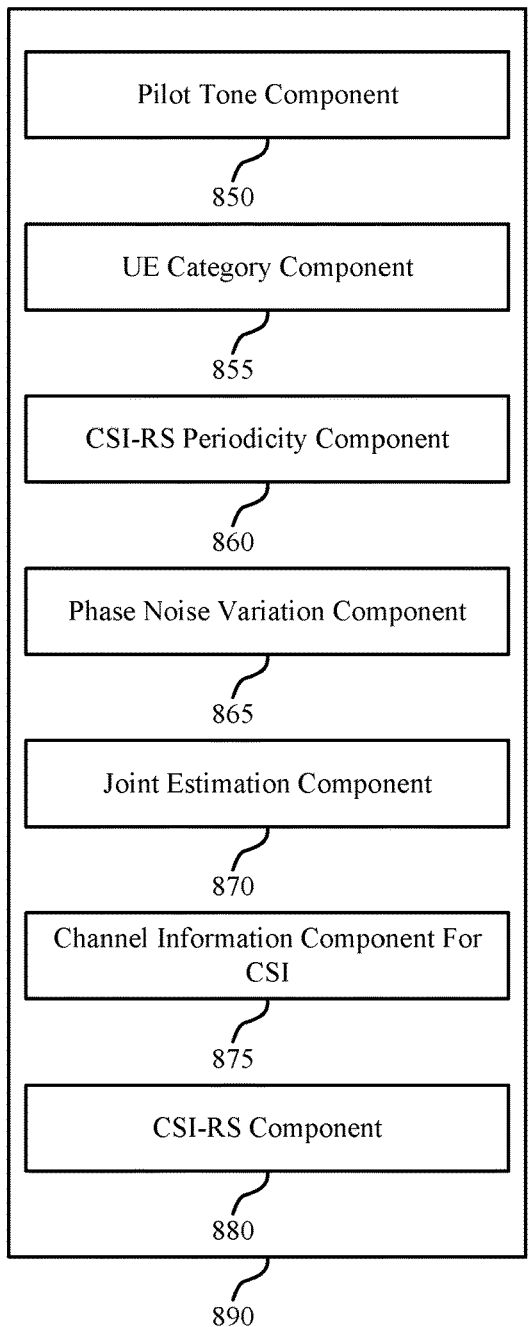

FIG. 8B shows a block diagram of a joint estimation manager 890 which may be an example of the corresponding component of wireless device 600 or wireless device 700. That is, joint estimation manager 890 may be an example of aspects of joint estimation manager 620 or joint estimation manager 750 described with reference to FIGS. 6 and 7. The joint estimation manager 890 may additionally or alternatively be an example of aspects of the joint estimation manager 940 described with reference to FIG. 9.

The joint estimation manager 890 may include pilot tone component 850, UE category component 855, CSI-RS periodicity component 860, phase noise variation component 865, joint estimation component 870, channel information component for CSI 875 and CSI-RS component 880. Each of these modules may communicate, directly or indirectly, with one another (e.g., via one or more buses).

The pilot tone component 850 may adjust a location of the set of pilot tones in the frequency domain, adjust a number of the set of pilot tones based on the determined category, and identify a set of pilot tones adjacent to each other, where the joint estimation is based on the set of pilot tones. In some cases, the set of pilot tones are surrounded in the frequency domain by a set of null tones. In some cases, the set of pilot tones include phase noise compensation reference signals (PC-RS). In some cases, the adjusting is based on a frequency hopping pattern.

The UE category component 855 may determine a category associated with a receiving device, receive an indication of the category via radio resource control (RRC) signaling, and transmit an indication of the category via radio resource control (RRC) signaling.

The CSI-RS periodicity component 860 may identify a time periodicity of the periodic signal. The phase noise variation component 865 may determine a phase noise variation based on the CSI-RS, the periodic signal, and a time periodicity of the periodic signal, where the joint estimation is based on the phase noise variation.

The joint estimation component 870 may generate a channel estimate and a phase noise estimate using a joint estimation based on the CSI-RS. In some cases, the channel estimate includes a channel estimation for each of a set of antenna ports. The channel information component for CSI 875 may transmit a channel information message to a base station based on the channel estimate and the phase noise estimate.

The CSI-RS component 880 may receive a periodic signal including at least one repetition of the CSI-RS, where the joint estimation is based on the periodic signal, and receive at least one CSI-RS during a symbol period. In some cases, the periodic signal in time domain is generated by inserting a CSI-RS tone in every n-th tone of the periodic signal and by inserting null values in other tones of the periodic signal. In some cases, the n is determined based on a category of a receiving device.

Figure 9:
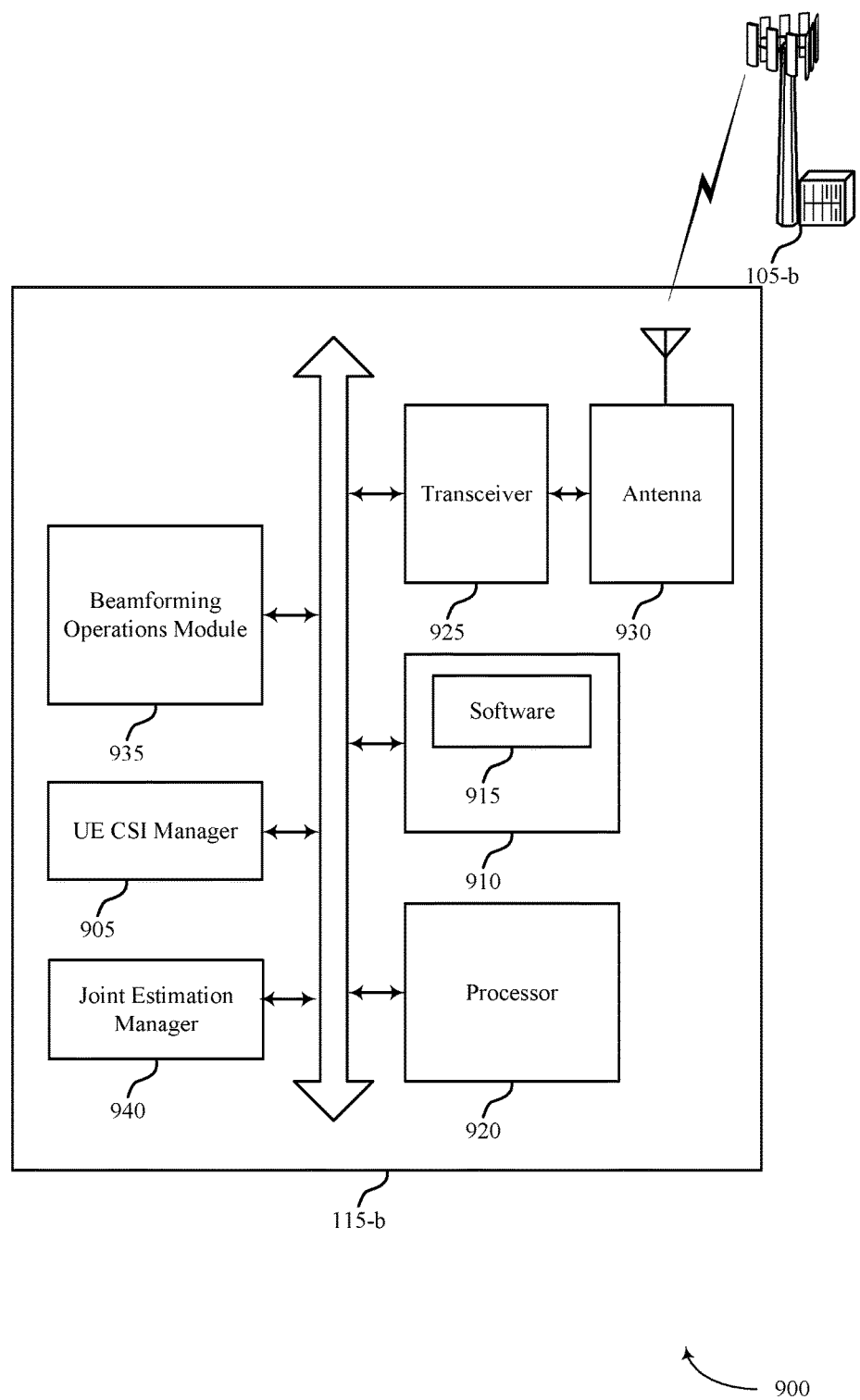
FIG. 9 illustrates a block diagram of a system including a UE that supports channel information reporting and CSI estimation with phase noise in accordance with aspects of the present disclosure.

FIG. 9 shows a diagram of a system 900 including a device that supports channel information reporting and CSI estimation with phase noise in accordance with various aspects of the present disclosure. For example, system 900 may include UE 115-b, which may be an example of a wireless device 600, a wireless device 700, or a UE 115 as described with reference to FIGS. 1 through 8.

UE 115-b may additionally or alternatively include a UE CSI manager 905, a joint estimation manager 940, a memory 910, a processor 920, a transceiver 925, an antenna 930 and a beamforming operations module 935. Each of these modules may communicate, directly or indirectly, with one another (e.g., via one or more buses). The UE CSI manager 905 may be an example of a UE CSI manager as described with reference to FIGS. 6 through 8. The joint estimation manager 940 may be an example of a joint estimation manager as described with reference to FIGS. 6 through 8.

The memory 910 may include random access memory (RAM) and read only memory (ROM). The memory 910 may store computer-readable, computer-executable software including instructions that, when executed, cause the processor to perform various functions described herein (e.g., channel information reporting, CSI estimation with phase noise, etc.). In some cases, the software 915 may not be directly executable by the processor but may cause a computer (e.g., when compiled and executed) to perform functions described herein. The processor 920 may include an intelligent hardware device, (e.g., a central processing unit (CPU), a microcontroller, an application specific integrated circuit (ASIC), etc.).

The transceiver 925 may communicate bi-directionally, via one or more antennas, wired, or wireless links, with one or more networks, as described above. For example, the transceiver 925 may communicate bi-directionally with a base station 105 or a UE 115. The transceiver 925 may additionally or alternatively include a modem to modulate the packets and provide the modulated packets to the antennas for transmission, and to demodulate packets received from the antennas. In some cases, the wireless device may include a single antenna 930. However, in some cases the device may have more than one antenna 930, which may be capable of concurrently transmitting or receiving multiple wireless transmissions.

The beamforming operations module 935 may enable operations including transmitting and receiving directional transmissions using an array of antennas.

Figure 10:
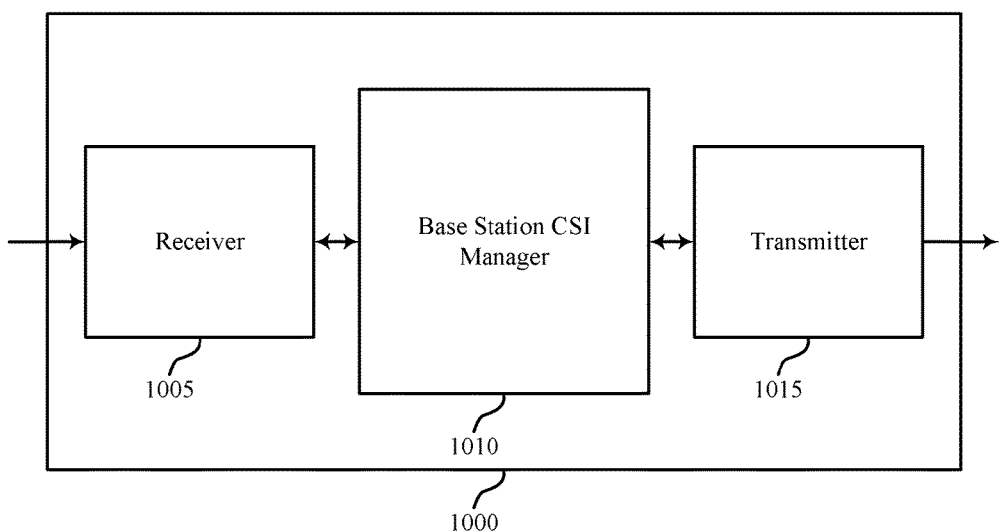
FIGS. 10 through 12 show block diagrams of a wireless device that supports channel information reporting and CSI estimation with phase noise in accordance with aspects of the present disclosure.

FIG. 10 shows a block diagram of a wireless device 1000 that supports channel information reporting and CSI estimation with phase noise in accordance with various aspects of the present disclosure. Wireless device 1000 may be an example of aspects of a base station 105 described with reference to FIGS. 1 through 5. Wireless device 1000 may include a receiver 1005, a base station CSI manager 1010 and a transmitter 1015. Wireless device 1000 may additionally or alternatively include a processor. Each of these components may be in communication with each other.

The receiver 1005 may receive information such as packets, user data, or control information associated with various information channels (e.g., control channels, data channels, and information related to channel information reporting, information related to CSI estimation with phase noise etc.). Information may be passed on to other components of the device. The receiver 1005 may be an example of aspects of the transceiver 1325 described with reference to FIG. 13.

The base station CSI manager 1010 may transmit, to a UE during a symbol period, at least one PC-RS and at least one CSI-RS, and receive a channel information message comprising a first channel information, the first channel information is based on the CSI-RS and the PC-RS. The base station CSI manager 1010 may transmit at least one CSI-RS, and receive a channel information message from a user equipment (UE), the channel information message based on a channel estimate and a phase noise estimate generated using a joint estimation based on the CSI-RS. The base station CSI manager 1010 may additionally or alternatively be an example of aspects of the base station CSI manager 1305 described with reference to FIG. 13.

The transmitter 1015 may transmit signals received from other components of wireless device 1000. In some examples, the transmitter 1015 may be collocated with a receiver in a transceiver module. For example, the transmitter 1015 may be an example of aspects of the transceiver 1325 described with reference to FIG. 13. The transmitter 1015 may include a single antenna, or it may include a plurality of antennas.

Figure 11:
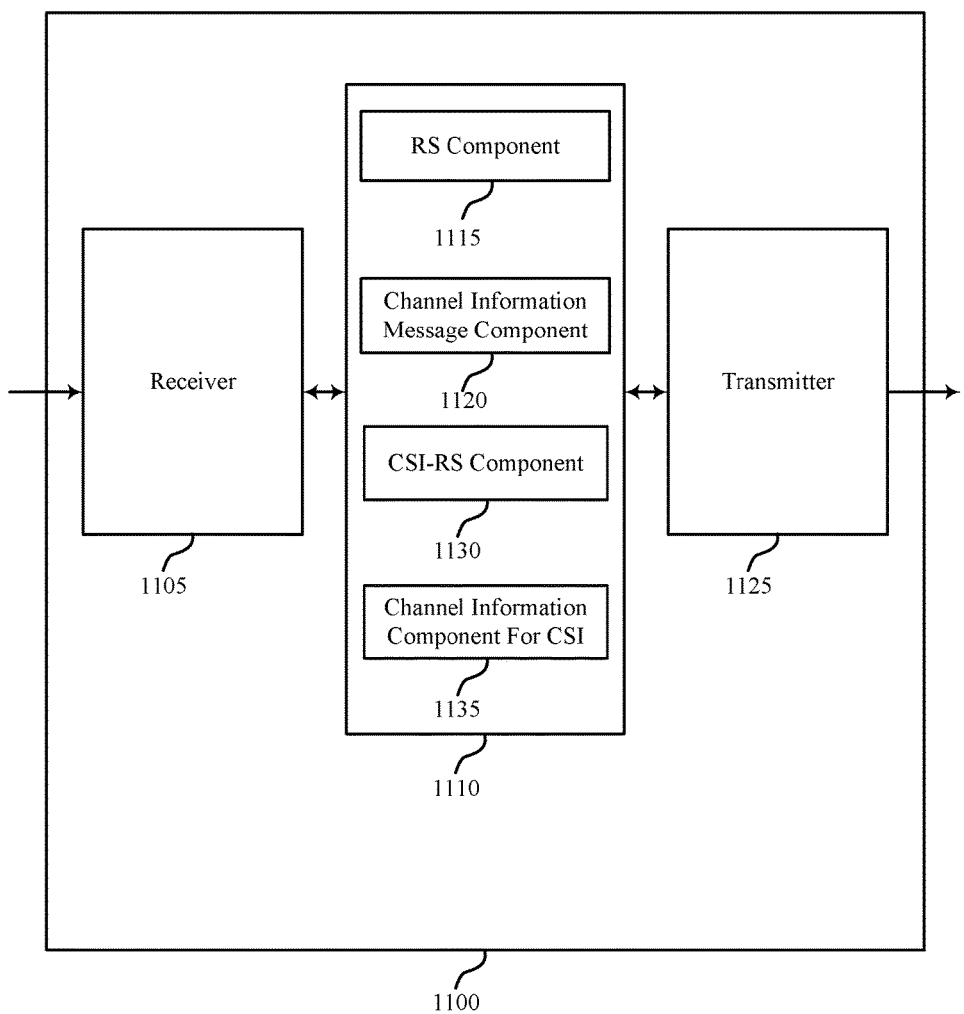

FIG. 11 shows a block diagram of a wireless device 1100 that supports channel information reporting and CSI estimation with phase noise in accordance with various aspects of the present disclosure. Wireless device 1100 may be an example of aspects of a wireless device 1000 or a base station 105 described with reference to FIGS. 1 through 5 and 10. Wireless device 1100 may include a receiver 1105, a base station CSI manager 1110 and a transmitter 1125. Wireless device 1100 may additionally or alternatively include a processor. Each of these components may be in communication with each other.

The receiver 1105 may receive information which may be passed on to other components of the device. The receiver 1105 may additionally or alternatively perform the functions described with reference to the receiver 1005 of FIG. 10. The receiver 1105 may be an example of aspects of the transceiver 1325 described with reference to FIG. 13.

The base station CSI manager 1110 may be an example of aspects of base station CSI manager 1010 described with reference to FIG. 10. The base station CSI manager 1110 may include RS component 1115, channel information message component 1120, CSI-RS component 1130, and channel information component for CSI 1135. The base station CSI manager 1110 may be an example of aspects of the base station CSI manager 1305 described with reference to FIG. 13.

The RS component 1115 may transmit, to a UE during a symbol period, at least one PC-RS and at least one CSI-RS. The channel information message component 1120 may receive a channel information message comprising a first channel information, the first channel information is based on the CSI-RS and the PC-RS, and receive the channel information message comprising both the first channel information and the second channel information.

In some cases, the first channel information comprises a phase noise corrected channel measurement. In some cases, the channel information message additionally or alternatively comprises a second channel information based on the CSI-RS. In some cases, the second channel information comprises a non-phase noise corrected channel measurement. In some cases, the first channel information and the second channel information comprises at least one of a CQI, a rank indicator, a precoding matrix indicator, a beam indicator, or combinations thereof. In some cases, the channel information message is received on a PUCCH. In some cases, the channel information message is received in a RACH subframe. In some cases, the channel information message is received in an UCI of a PUSCH.

The CSI-RS component 1130 may transmit at least one CSI-RS. The channel information component for CSI 1135 may receive a channel information message from a user equipment (UE), the channel information message based on a channel estimate and a phase noise estimate generated using a joint estimation based on the CSI-RS. In some cases, the channel estimate includes a channel estimation for each of a set of antenna ports.

The transmitter 1125 may transmit signals received from other components of wireless device 1100. In some examples, the transmitter 1125 may be collocated with a receiver in a transceiver module. For example, the transmitter 1125 may be an example of aspects of the transceiver 1325 described with reference to FIG. 13. The transmitter 1125 may utilize a single antenna, or it may utilize a plurality of antennas.

Figure 12:
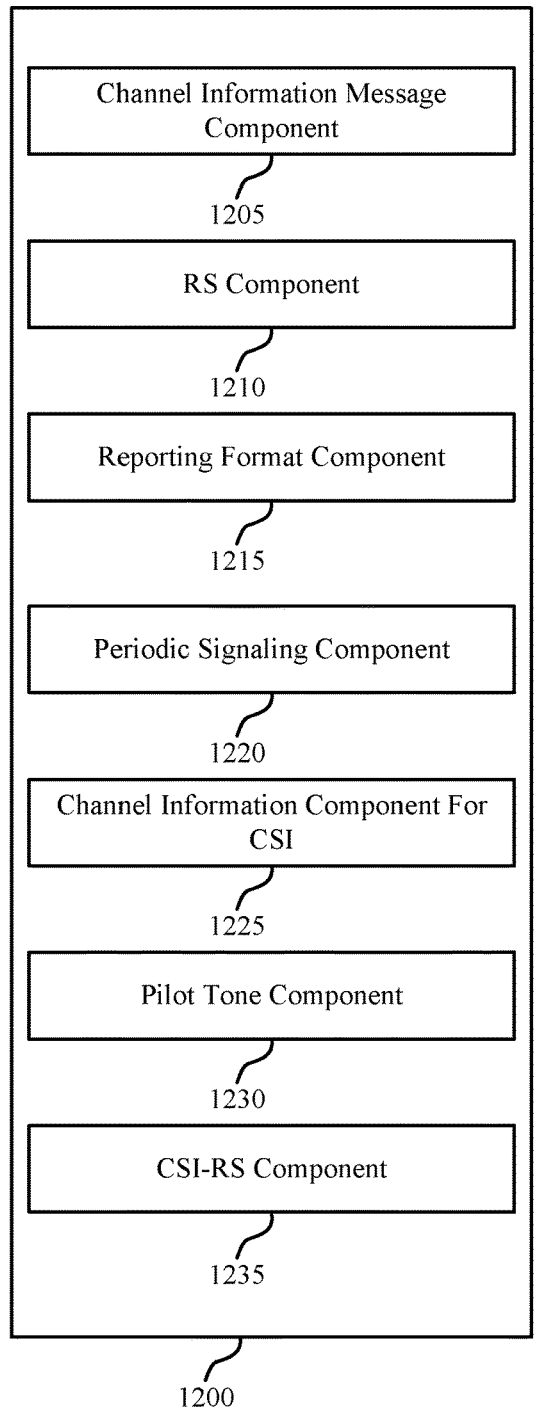

FIG. 12 shows a block diagram of a base station CSI manager 1200 which may be an example of the corresponding component of wireless device 1000 or wireless device 1100. That is, base station CSI manager 1200 may be an example of aspects of base station CSI manager 1010 or base station CSI manager 1110 described with reference to FIGS. 10 and 11. The base station CSI manager 1200 may additionally or alternatively be an example of aspects of the base station CSI manager 1305 described with reference to FIG. 13.

The base station CSI manager 1200 may include a channel information message component 1205, a RS component 1210, a reporting format component 1215, a periodic signaling component 1220, a channel information component for CSI 1225, a pilot tone component 1230 and a CSI-RS component 1235. Each of these modules may communicate, directly or indirectly, with one another (e.g., via one or more buses).

The channel information message component 1205 may receive a channel information message comprising a first channel information, the first channel information is based on the CSI-RS and the PC-RS, and receive the channel information message comprising both the first channel information and the second channel information. In some cases, the first channel information comprises a phase noise corrected channel measurement. In some cases, the channel information message additionally or alternatively comprises a second channel information based on the CSI-RS. In some cases, the second channel information comprises a non-phase noise corrected channel measurement.

The RS component 1210 may transmit, to a UE during a symbol period, at least one PC-RS and at least one CSI-RS. The reporting format component 1215 may transmit, to the UE, a channel reporting format message that comprises a format indicator for the channel information message, and reserve one or more bits in a DCI to convey the indication of the format indicator for the channel information message. In some cases, the channel reporting format message is transmitted on a PDCCH. In some cases, the format indicator comprises at least one of a request for the UE to report the first channel information or a request for the UE to report the first channel information and the second channel information.

The periodic signaling component 1220 may transmit a periodic signal including at least one repetition of the CSI-RS, where the joint estimation is based on the periodic signal. The channel information component for CSI 1225 may receive a channel information message from a UE, the channel information message based on a channel estimate and a phase noise estimate generated using a joint estimation based on the CSI-RS. In some cases, the channel estimate includes a channel estimation for each of a set of antenna ports.

The pilot tone component 1230 may transmit a set of pilot tones adjacent to each other, where the joint estimation is based on the set of pilot tones. In some cases, the set of pilot tones are surrounded in the frequency domain by a set of null tones. The CSI-RS component 1235 may transmit at least one CSI-RS.

Figure 13:
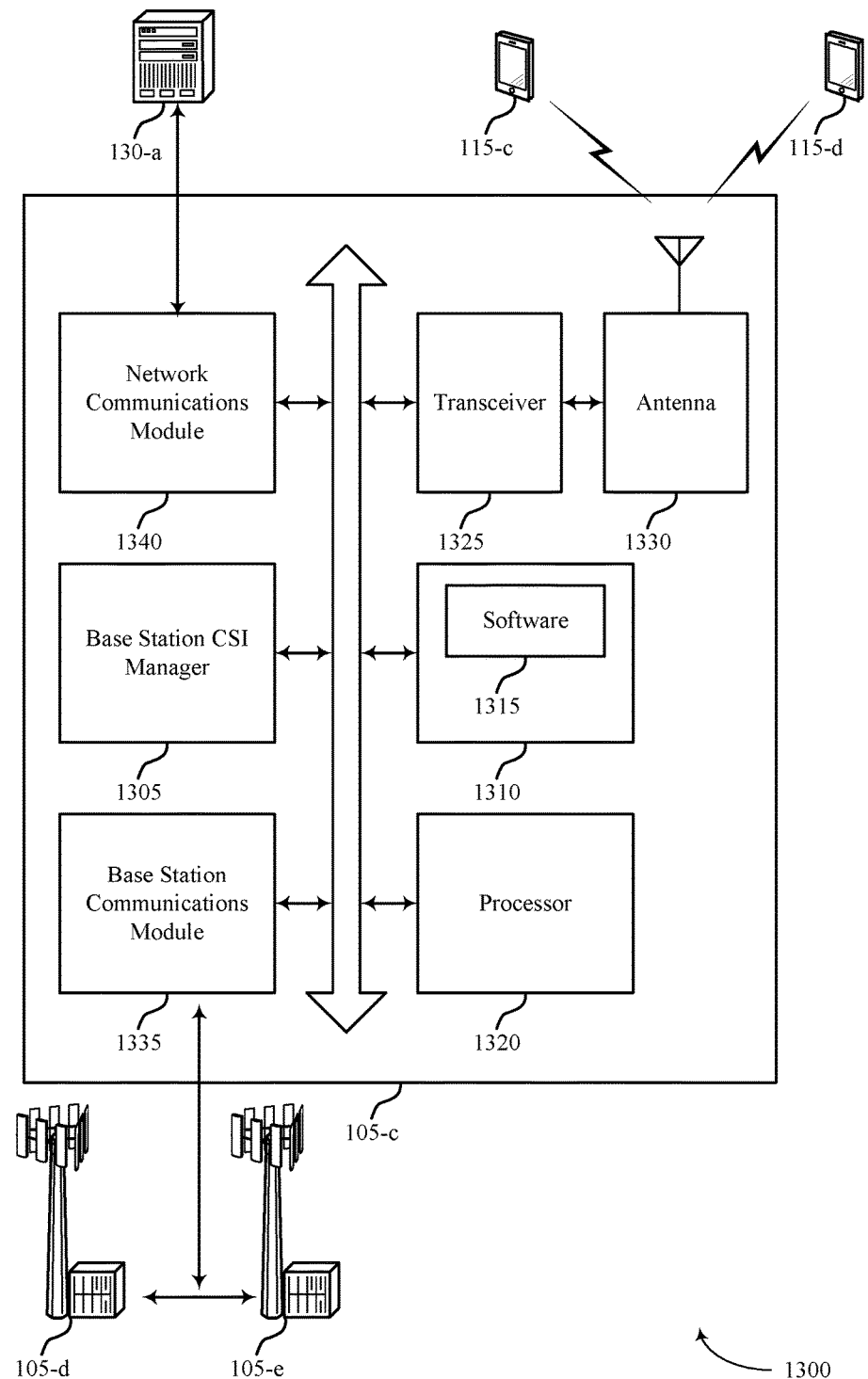
FIG. 13 illustrates a block diagram of a system including a base station that supports channel information reporting and CSI estimation with phase noise in accordance with aspects of the present disclosure.

FIG. 13 shows a diagram of a wireless system 1300 including a device configured that supports channel information reporting and CSI estimation with phase noise in accordance with various aspects of the present disclosure. For example, system 1300 may include base station 105-c, which may be an example of a wireless device 1000, a wireless device 1100, or a base station 105 as described with reference to FIGS. 1 through 5 and 10 through 12. Base station 105-c may additionally or alternatively include components for bi-directional voice and data communications including components for transmitting communications and components for receiving communications. For example, base station 105-c may communicate bi-directionally with one or more UEs 115.

Base station 105-c may additionally or alternatively include a base station CSI manager 1305, a memory 1310, a processor 1320, a transceiver 1325, an antenna 1330, a base station communications module 1335 and a network communications module 1340. Each of these modules may communicate, directly or indirectly, with one another (e.g., via one or more buses). The base station CSI manager 1305 may be an example of a base station CSI manager as described with reference to FIGS. 10 through 12.

The memory 1310 may include RAM and ROM. The memory 1310 may store computer-readable, computer-executable software including instructions that, when executed, cause the processor to perform various functions described herein (e.g., channel information reporting, etc.). In some cases, the software 1315 may not be directly executable by the processor but may cause a computer (e.g., when compiled and executed) to perform functions described herein. The processor 1320 may include an intelligent hardware device, (e.g., a CPU, a microcontroller, an ASIC, etc.)

The transceiver 1325 may communicate bi-directionally, via one or more antennas, wired, or wireless links, with one or more networks, as described above. For example, the transceiver 1325 may communicate bi-directionally with a base station 105 or a UE 115. The transceiver 1325 may additionally or alternatively include a modem to modulate the packets and provide the modulated packets to the antennas for transmission, and to demodulate packets received from the antennas. In some cases, the wireless device may include a single antenna 1330. However, in some cases the device may have more than one antenna 930, which may be capable of concurrently transmitting or receiving multiple wireless transmissions.

The base station communications module 1335 may manage communications with other base station 105, and may include a controller or scheduler for controlling communications with UEs 115 in cooperation with other base stations 105. For example, the base station communications module 1335 may coordinate scheduling for transmissions to UEs 115 for various interference mitigation techniques such as beamforming or joint transmission. In some examples, base station communications module 1335 may provide an X2 interface within an LTE/LTE-A wireless communication network technology to provide communication between base stations 105.

The network communications module 1340 may manage communications with the core network (e.g., via one or more wired backhaul links). For example, the network communications module 1340 may manage the transfer of data communications for client devices, such as one or more UEs 115.

Figure 14:
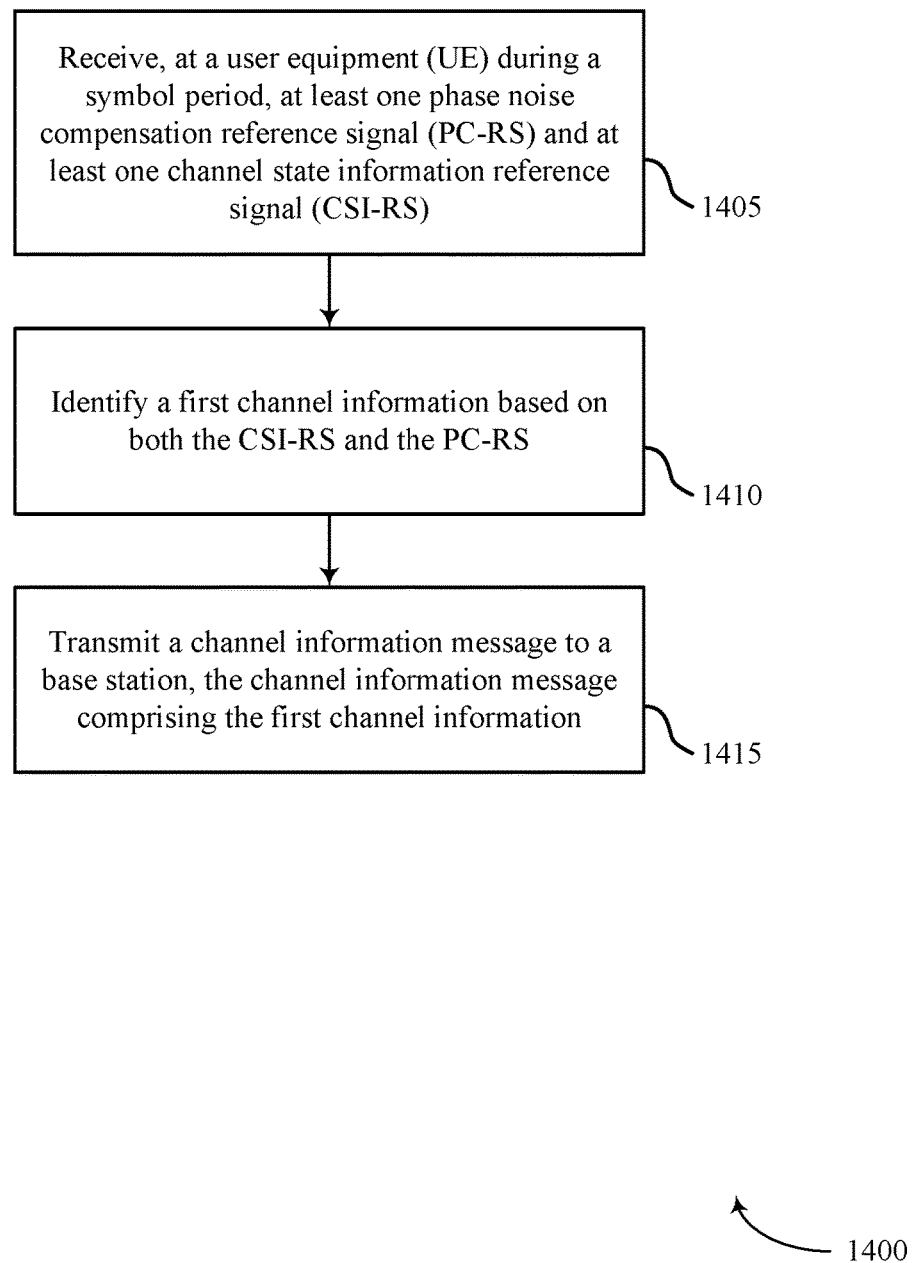
FIGS. 14 through 18 illustrate methods for channel information reporting in accordance with aspects of the present disclosure.

FIG. 14 shows a flowchart illustrating a method 1400 for channel information reporting in accordance with various aspects of the present disclosure. The operations of method 1400 may be implemented by a device such as a UE 115 or its components as described with reference to FIGS. 1 through 5. For example, the operations of method 1400 may be performed by the UE CSI manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may receive, during a symbol period, at least one PC-RS and at least one CSI-RS as described above with reference to FIGS. 2 through 5. In some examples, the operations of block 1405 may be performed by the RS component as described with reference to FIGS. 7 and 8.

At block 1410, the UE 115 may identify a first channel information based on both the CSI-RS and the PC-RS as described above with reference to FIGS. 2 through 5. In some examples, the operations of block 1410 may be performed by the channel information component as described with reference to FIGS. 7 and 8.

At block 1415, the UE 115 may transmit a channel information message to a base station, the channel information message comprising the first channel information as described above with reference to FIGS. 2 through 5. In some examples, the operations of block 1415 may be performed by the channel information message component as described with reference to FIGS. 7 and 8.

Figure 15:
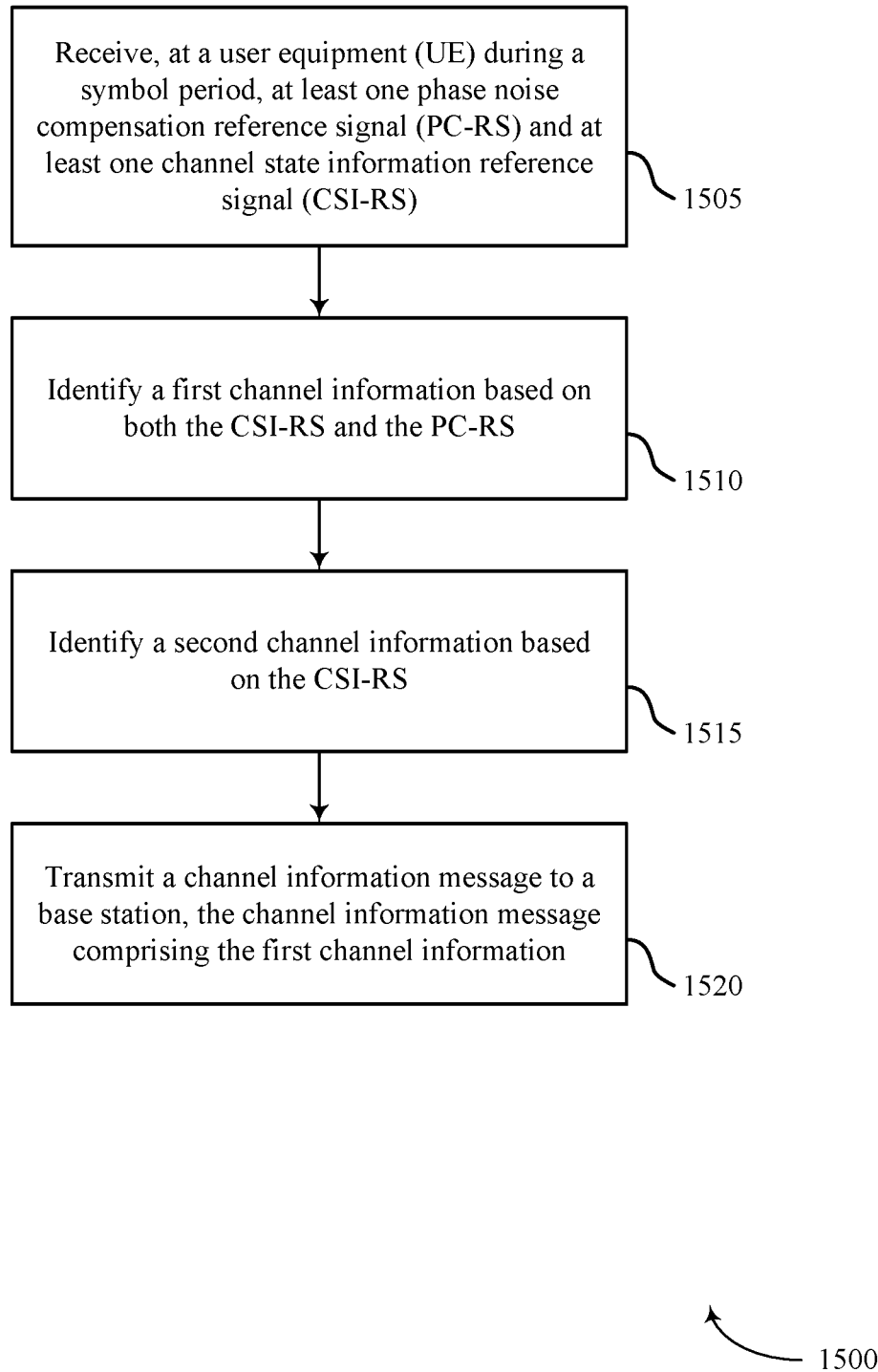

FIG. 15 shows a flowchart illustrating a method 1500 for channel information reporting in accordance with various aspects of the present disclosure. The operations of method 1500 may be implemented by a device such as a UE 115 or its components as described with reference to FIGS. 1 through 5. For example, the operations of method 1500 may be performed by the UE CSI manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may receive, during a symbol period, at least one PC-RS and at least one CSI-RS as described above with reference to FIGS. 2 through 5. In some examples, the operations of block 1505 may be performed by the RS component as described with reference to FIGS. 7 and 8.

At block 1510, the UE 115 may identify a first channel information based on both the CSI-RS and the PC-RS as described above with reference to FIGS. 2 through 5. In some examples, the operations of block 1510 may be performed by the channel information component as described with reference to FIGS. 7 and 8.

At block 1515, the UE 115 may identify a second channel information based on the CSI-RS as described above with reference to FIGS. 2 through 5. In some examples, the operations of block 1515 may be performed by the channel information component as described with reference to FIGS. 7 and 8.

At block 1520, the UE 115 may transmit a channel information message to a base station, the channel information message comprising the first channel information as described above with reference to FIGS. 2 through 5. In some examples, the operations of block 1520 may be performed by the channel information message component as described with reference to FIGS. 7 and 8.

Figure 16:
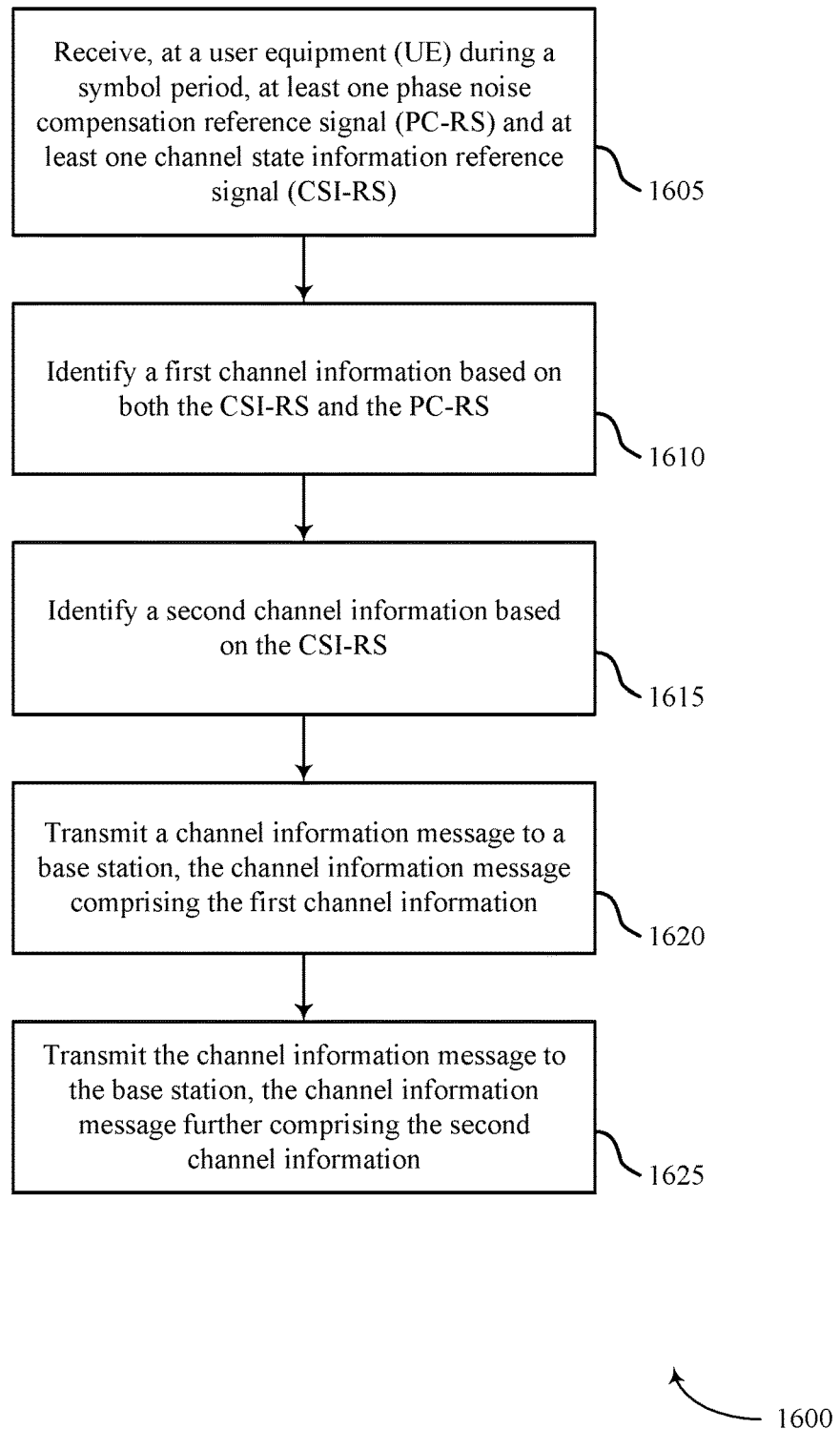

FIG. 16 shows a flowchart illustrating a method 1600 for channel information reporting in accordance with various aspects of the present disclosure. The operations of method 1600 may be implemented by a device such as a UE 115 or its components as described with reference to FIGS. 1 through 5. For example, the operations of method 1600 may be performed by the UE CSI manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may receive, during a symbol period, at least one PC-RS and at least one CSI-RS as described above with reference to FIGS. 2 through 5. In some examples, the operations of block 1605 may be performed by the RS component as described with reference to FIGS. 7 and 8.

At block 1610, the UE 115 may identify a first channel information based on both the CSI-RS and the PC-RS as described above with reference to FIGS. 2 through 5. In some examples, the operations of block 1610 may be performed by the channel information component as described with reference to FIGS. 7 and 8.

At block 1615, the UE 115 may identify a second channel information based on the CSI-RS as described above with reference to FIGS. 2 through 5. In some examples, the operations of block 1615 may be performed by the channel information component as described with reference to FIGS. 7 and 8.

At block 1620, the UE 115 may transmit a channel information message to a base station, the channel information message comprising the first channel information as described above with reference to FIGS. 2 through 5. In some examples, the operations of block 1620 may be performed by the channel information message component as described with reference to FIGS. 7 and 8.

At block 1625, the UE 115 may transmit the channel information message to the base station, the channel information message additionally or alternatively comprising the second channel information as described above with reference to FIGS. 2 through 5. In some examples, the operations of block 1625 may be performed by the channel information message component as described with reference to FIGS. 7 and 8.

Figure 17:
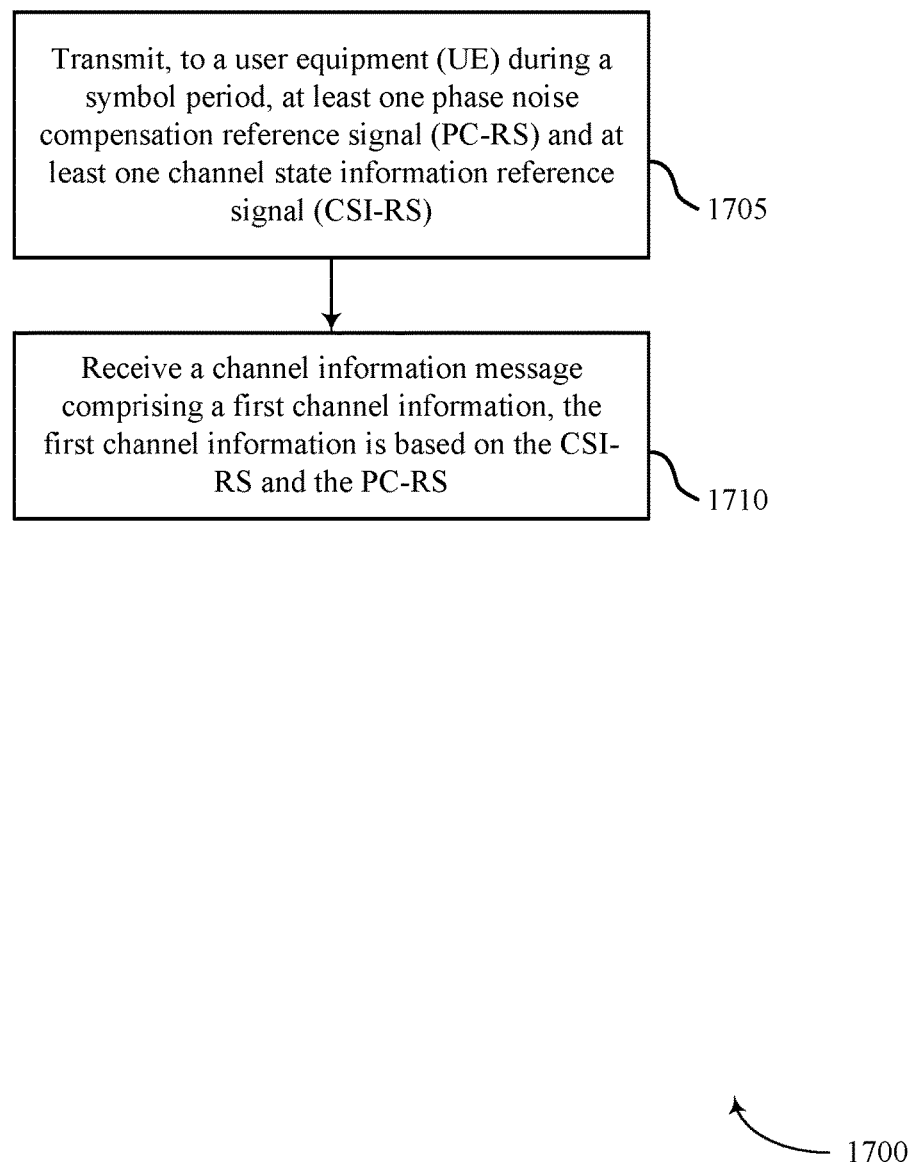

FIG. 17 shows a flowchart illustrating a method 1700 for channel information reporting in accordance with various aspects of the present disclosure. The operations of method 1700 may be implemented by a device such as a base station 105 or its components as described with reference to FIGS. 1 through 5. For example, the operations of method 1700 may be performed by the base station CSI manager as described herein. In some examples, the base station 105 may execute a set of codes to control the functional elements of the device to perform the functions described below. Additionally or alternatively, the base station 105 may perform aspects the functions described below using special-purpose hardware.

At block 1705, the base station 105 may transmit, to a UE during a symbol period, at least one PC-RS and at least one CSI-RS as described above with reference to FIGS. 2 through 5. In some examples, the operations of block 1705 may be performed by the RS component as described with reference to FIGS. 11 and 12.

At block 1710, the base station 105 may receive a channel information message comprising a first channel information, the first channel information is based on the CSI-RS and the PC-RS as described above with reference to FIGS. 2 through 5. In some examples, the operations of block 1710 may be performed by the channel information message component as described with reference to FIGS. 11 and 12.

Figure 18:
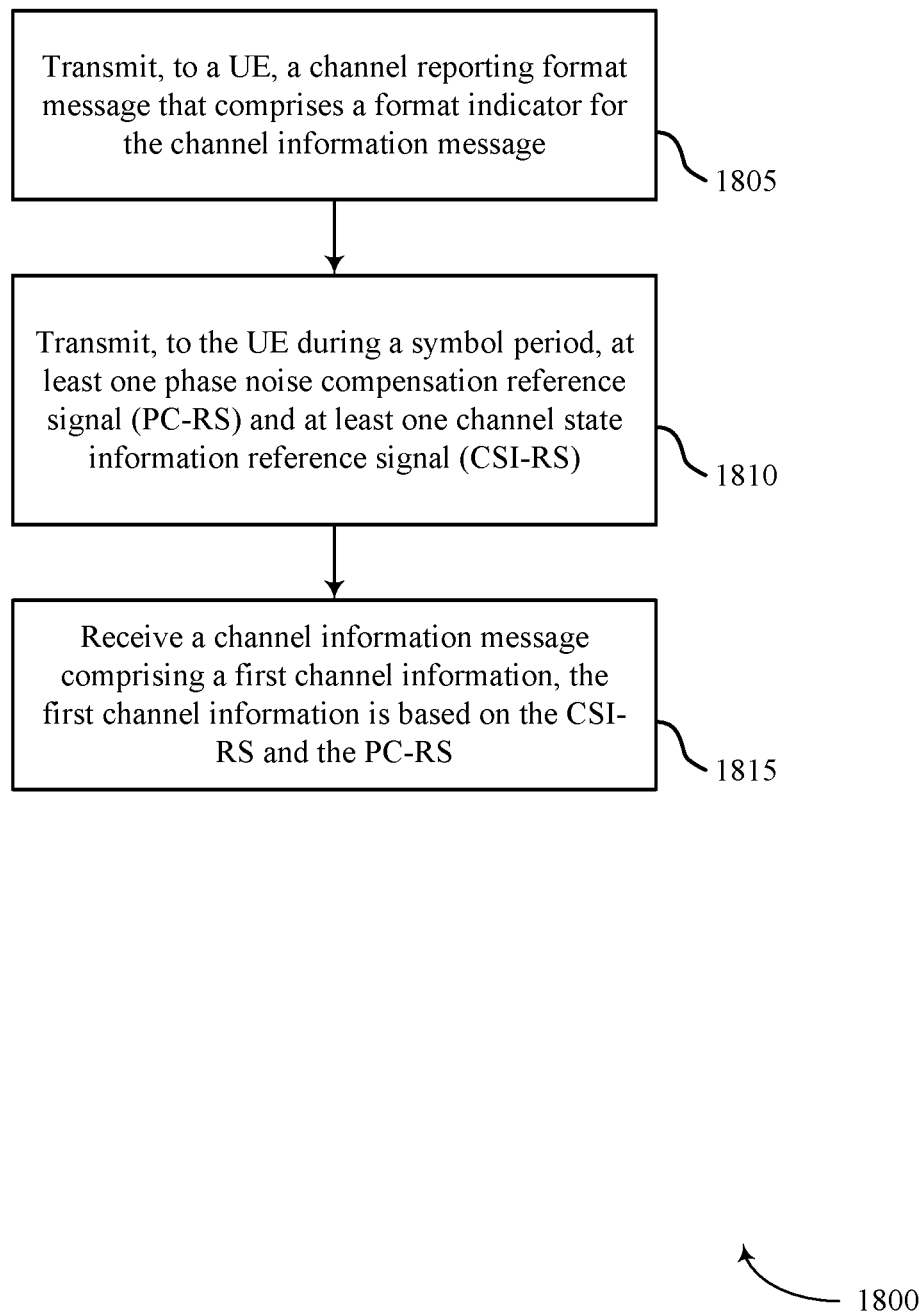

FIG. 18 shows a flowchart illustrating a method 1800 for channel information reporting in accordance with various aspects of the present disclosure. The operations of method 1800 may be implemented by a device such as a base station 105 or its components as described with reference to FIGS. 1 through 5. For example, the operations of method 1800 may be performed by the base station CSI manager as described herein. In some examples, the base station 105 may execute a set of codes to control the functional elements of the device to perform the functions described below.

Additionally or alternatively, the base station 105 may perform aspects the functions described below using special-purpose hardware.

At block 1805, the base station 105 may transmit, to a UE, a channel reporting format message that comprises a format indicator for the channel information message as described above with reference to FIGS. 2 through 5. In some examples, the operations of block 1805 may be performed by the reporting format component as described with reference to FIGS. 11 and 12.

At block 1810, the base station 105 may transmit, to a UE during a symbol period, at least one PC-RS and at least one CSI-RS as described above with reference to FIGS. 2 through 5. In some examples, the operations of block 1810 may be performed by the RS component as described with reference to FIGS. 11 and 12.

At block 1815, the base station 105 may receive a channel information message comprising a first channel information, the first channel information is based on the CSI-RS and the PC-RS as described above with reference to FIGS. 2 through 5. In some examples, the operations of block 1815 may be performed by the channel information message component as described with reference to FIGS. 11 and 12.

Figure 19:
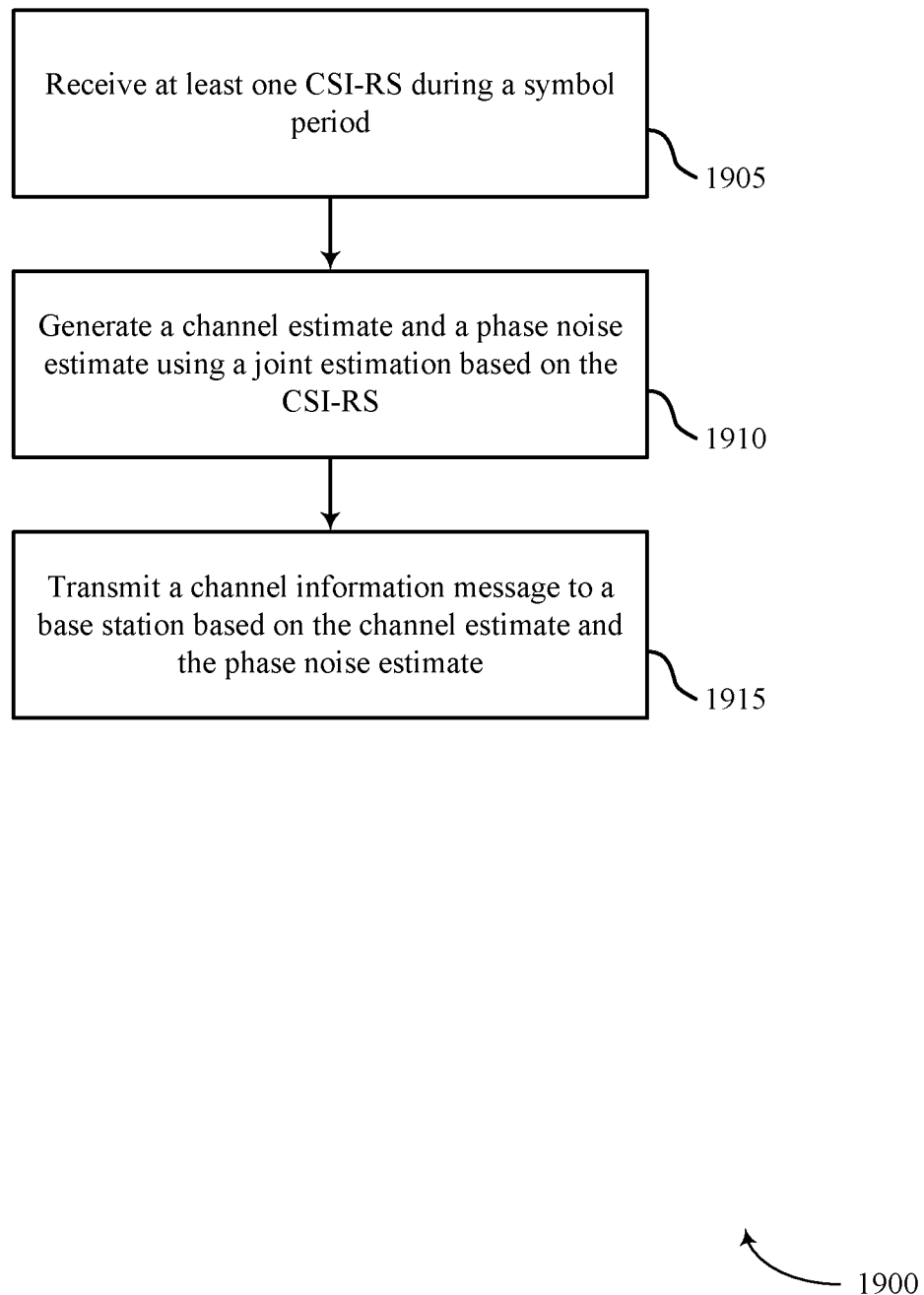
FIGS. 19 through 24 illustrate methods for CSI estimation with phase noise in accordance with aspects of the present disclosure.

FIG. 19 shows a flowchart illustrating a method 1900 for CSI estimation with phase noise in accordance with various aspects of the present disclosure. The operations of method 1900 may be implemented by a device such as a UE 115 or its components as described with reference to FIGS. 1 and 2. For example, the operations of method 1900 may be performed by the joint estimation manager as described herein. In some examples, the UE 115 may execute a set of codes to control the functional elements of the device to perform the functions described below. Additionally or alternatively, the UE 115 may perform aspects the functions described below using special-purpose hardware.

At block 1905, the UE 115 may receive at least one CSI-RS during a symbol period as described above with reference to FIGS. 2 through 5. In some examples, the operations of block 1905 may be performed by the CSI-RS component as described with reference to FIGS. 7 and 8.

At block 1910, the UE 115 may generate a channel estimate and a phase noise estimate using a joint estimation based on the CSI-RS as described above with reference to FIGS. 2 through 5. In some examples, the operations of block 1910 may be performed by the joint estimation component as described with reference to FIGS. 7 and 8.

At block 1915, the UE 115 may transmit a channel information message to a base station based on the channel estimate and the phase noise estimate as described above with reference to FIGS. 2 through 5. In some examples, the operations of block 1915 may be performed by the channel information component as described with reference to FIGS. 7 and 8.

Figure 20:
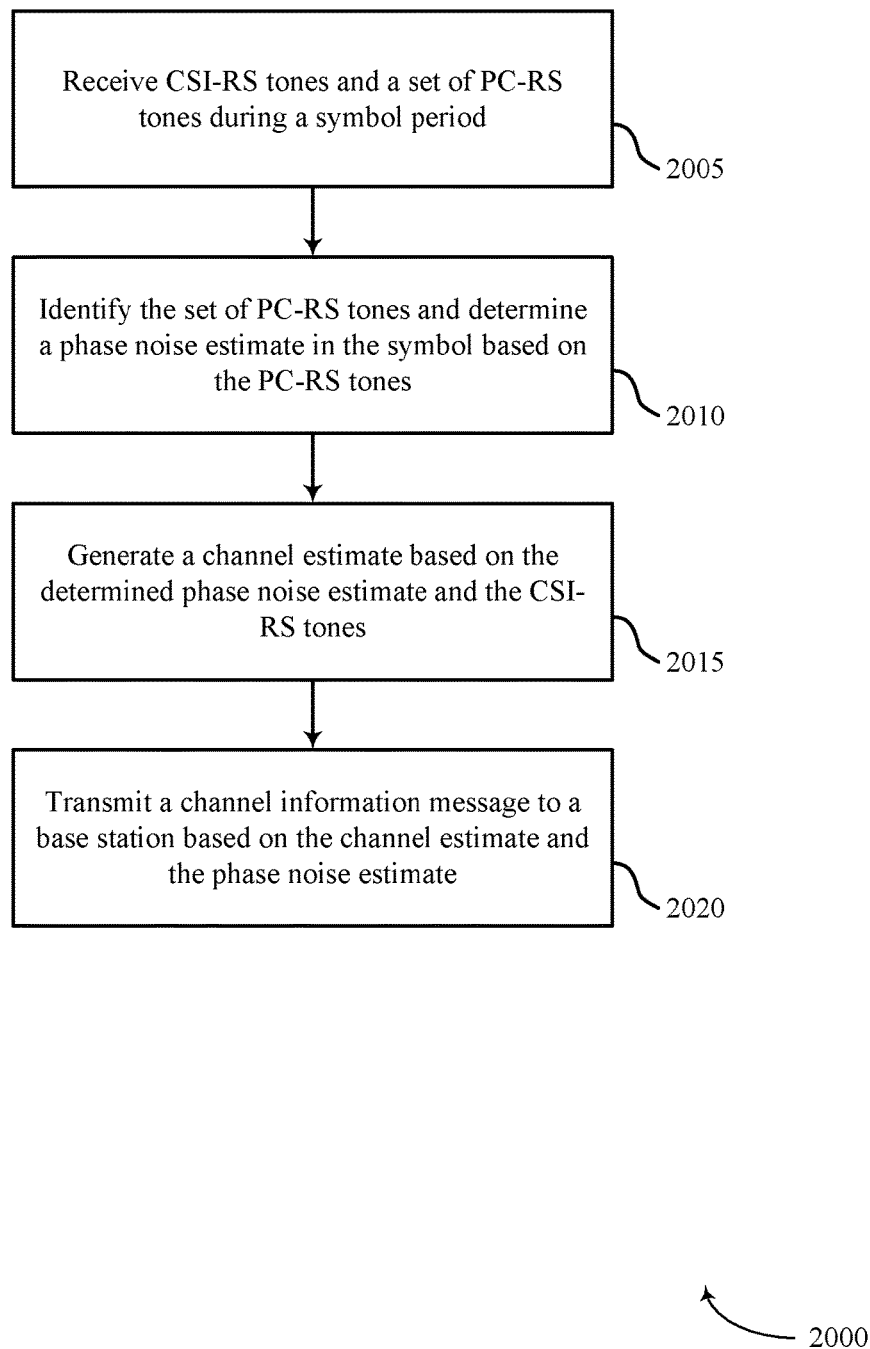

FIG. 20 shows a flowchart illustrating a method 2000 for CSI estimation with phase noise in accordance with various aspects of the present disclosure. The operations of method 2000 may be implemented by a device such as a UE 115 or its components as described with reference to FIGS. 1 and 2. For example, the operations of method 2000 may be performed by the joint estimation manager as described herein. In some examples, the UE 115 may execute a set of codes to control the functional elements of the device to perform the functions described below. Additionally or alternatively, the UE 115 may perform aspects the functions described below using special-purpose hardware.

At block 2005, the UE 115 may receive CSI-RS tones and a set of PC-RS tones during a symbol period as described above with reference to FIGS. 2 through 5. In some examples, the operations of block 2005 may be performed by the CSI-RS component as described with reference to FIGS. 7 and 8.

At block 2010, the UE 115 may identify the set of PC-RS tones and determine a phase noise estimate in the symbol based on the PC-RS tones as described above with reference to FIGS. 2 through 5. In some examples, the operations of block 2010 may be performed by the pilot tone component as described with reference to FIGS. 7 and 8.

At block 2015, the UE 115 may generate a channel estimate based on the determined phase noise estimate and the CSI-RS tones based on the CSI-RS as described above with reference to FIGS. 2 through 5. In some examples, the operations of block 2015 may be performed by the joint estimation component as described with reference to FIGS. 7 and 8.

At block 2020, the UE 115 may transmit a channel information message to a base station based on the channel estimate and the phase noise estimate as described above with reference to FIGS. 2 through 5. In some examples, the operations of block 2020 may be performed by the channel information component as described with reference to FIGS. 7 and 8.

Figure 21:
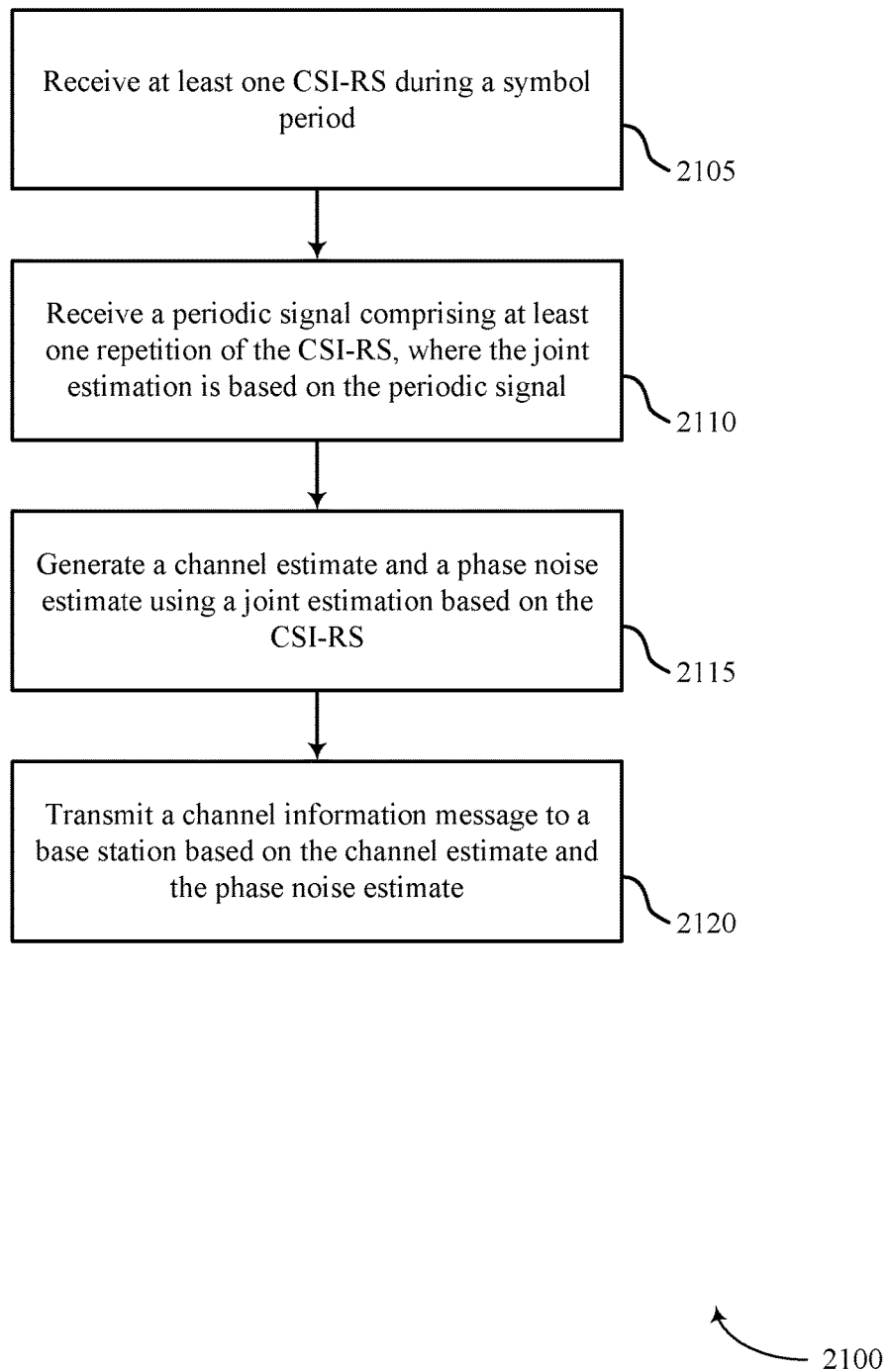

FIG. 21 shows a flowchart illustrating a method 2100 for CSI estimation with phase noise in accordance with various aspects of the present disclosure. The operations of method 2100 may be implemented by a device such as a UE 115 or its components as described with reference to FIGS. 1 and 2. For example, the operations of method 2100 may be performed by the joint estimation manager as described herein. In some examples, the UE 115 may execute a set of codes to control the functional elements of the device to perform the functions described below. Additionally or alternatively, the UE 115 may perform aspects the functions described below using special-purpose hardware.

At block 2105, the UE 115 may receive at least one CSI-RS during a symbol period as described above with reference to FIGS. 2 through 5. In some examples, the operations of block 2105 may be performed by the CSI-RS component as described with reference to FIGS. 7 and 8.

At block 2110, the UE 115 may receive a periodic signal including at least one repetition of the CSI-RS, where the joint estimation is based on the periodic signal as described above with reference to FIGS. 2 through 5. In some examples, the operations of block 2110 may be performed by the CSI-RS component as described with reference to FIGS. 7 and 8.

At block 2115, the UE 115 may generate a channel estimate and a phase noise estimate using a joint estimation based on the CSI-RS as described above with reference to FIGS. 2 through 5. In some examples, the operations of block 2115 may be performed by the joint estimation component as described with reference to FIGS. 7 and 8.

At block 2120, the UE 115 may transmit a channel information message to a base station based on the channel estimate and the phase noise estimate as described above with reference to FIGS. 2 through 5. In some examples, the operations of block 2120 may be performed by the channel information component as described with reference to FIGS. 7 and 8.

Figure 22:
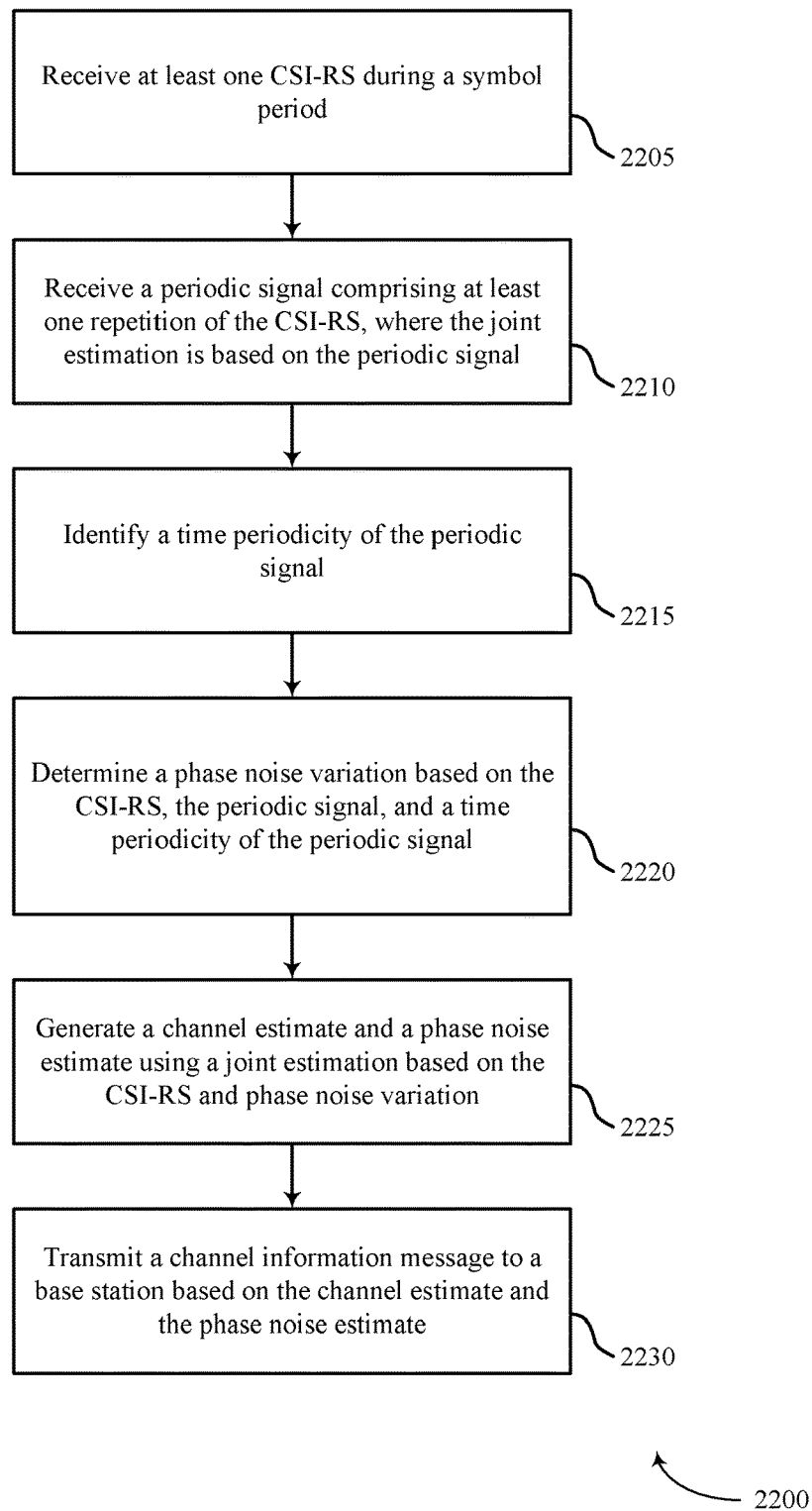

FIG. 22 shows a flowchart illustrating a method 2200 for CSI estimation with phase noise in accordance with various aspects of the present disclosure. The operations of method 2200 may be implemented by a device such as a UE 115 or its components as described with reference to FIGS. 1 and 2. For example, the operations of method 2200 may be performed by the joint estimation manager as described herein. In some examples, the UE 115 may execute a set of codes to control the functional elements of the device to perform the functions described below. Additionally or alternatively, the UE 115 may perform aspects the functions described below using special-purpose hardware.

At block 2205, the UE 115 may receive at least one CSI-RS during a symbol period as described above with reference to FIGS. 2 through 5. In some examples, the operations of block 2205 may be performed by the CSI-RS component as described with reference to FIGS. 7 and 8.

At block 2210, the UE 115 may receive a periodic signal including at least one repetition of the CSI-RS, where the joint estimation is based on the periodic signal as described above with reference to FIGS. 2 through 5. In some examples, the operations of block 2210 may be performed by the CSI-RS component as described with reference to FIGS. 7 and 8.

At block 2215, the UE 115 may identify a time periodicity of the periodic signal as described above with reference to FIGS. 2 through 5. In some examples, the operations of block 2215 may be performed by the CSI-RS periodicity component as described with reference to FIGS. 7 and 8.

At block 2220, the UE 115 may determine a phase noise variation based on the CSI-RS, the periodic signal, and a time periodicity of the periodic signal as described above with reference to FIGS. 2 through 5. In some examples, the operations of block 2220 may be performed by the phase noise variation component as described with reference to FIGS. 7 and 8.

At block 2225, the UE 115 may generate a channel estimate and a phase noise estimate using a joint estimation based on the CSI-RS and phase noise variation as described above with reference to FIGS. 2 through 5. In some examples, the operations of block 2225 may be performed by the joint estimation component as described with reference to FIGS. 7 and 8.

At block 2230, the UE 115 may transmit a channel information message to a base station based on the channel estimate and the phase noise estimate as described above with reference to FIGS. 2 through 5. In some examples, the operations of block 2230 may be performed by the channel information component as described with reference to FIGS. 7 and 8.

Figure 23:
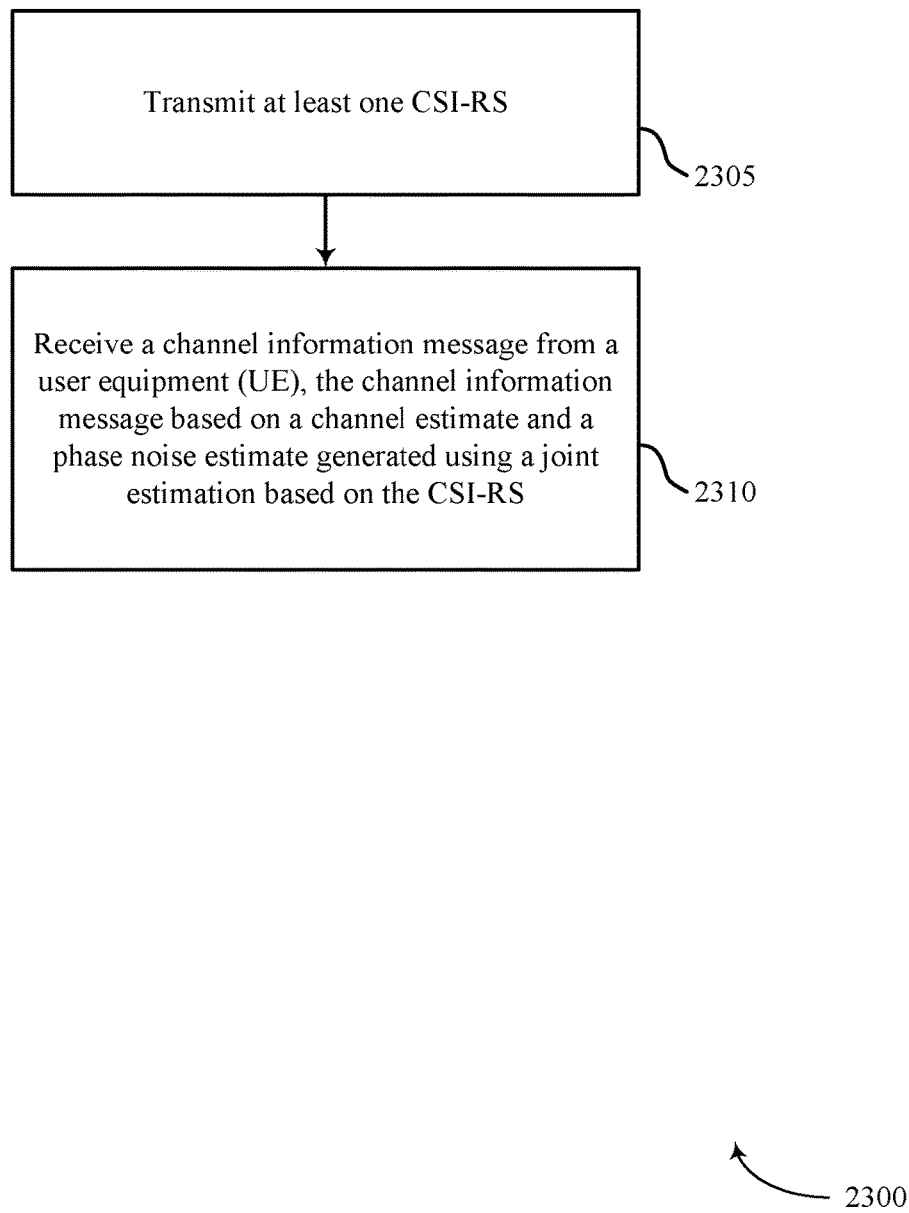

FIG. 23 shows a flowchart illustrating a method 2300 for CSI estimation with phase noise in accordance with various aspects of the present disclosure. The operations of method 2300 may be implemented by a device such as a base station 105 or its components as described with reference to FIGS. 1 and 2. For example, the operations of method 2300 may be performed by the base station CSI manager as described herein. In some examples, the base station 105 may execute a set of codes to control the functional elements of the device to perform the functions described below. Additionally or alternatively, the base station 105 may perform aspects the functions described below using special-purpose hardware.

At block 2305, the base station 105 may transmit at least one CSI-RS as described above with reference to FIGS. 2 through 5. In some examples, the operations of block 2305 may be performed by the CSI-RS component as described with reference to FIGS. 11 and 12.

At block 2310, the base station 105 may receive a channel information message from a user equipment (UE), the channel information message based on a channel estimate and a phase noise estimate generated using a joint estimation based on the CSI-RS as described above with reference to FIGS. 2 through 5. In some examples, the operations of block 2310 may be performed by the channel information component as described with reference to FIGS. 11 and 12.

Figure 24:
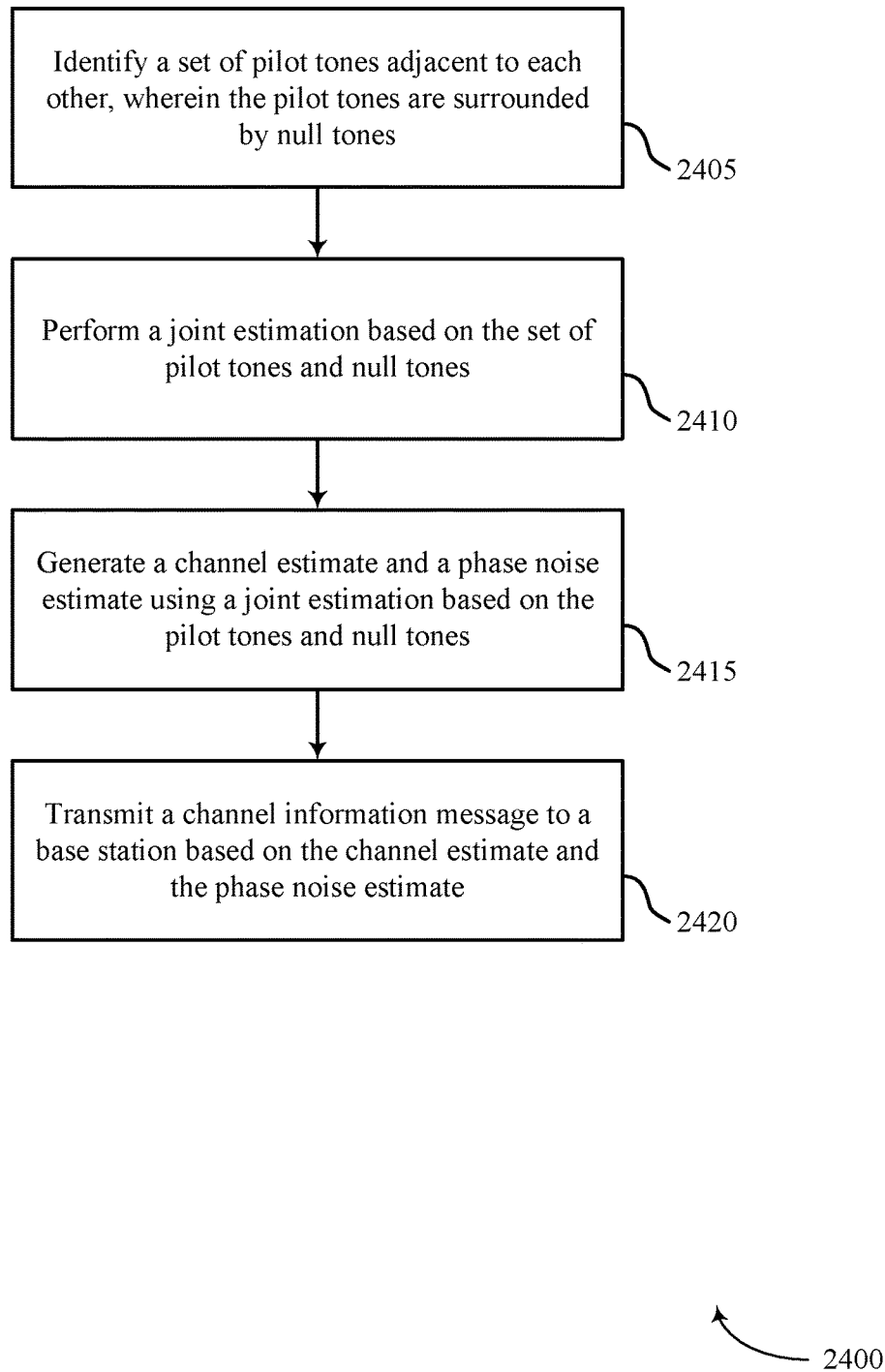

FIG. 24 shows a flowchart illustrating a method 2400 for CSI estimation with phase noise in accordance with various aspects of the present disclosure. The operations of method 2400 may be implemented by a device such as a UE 115 or its components as described with reference to FIGS. 1 and 2. For example, the operations of method 2400 may be performed by the joint estimation manager as described herein. In some examples, the UE 115 may execute a set of codes to control the functional elements of the device to perform the functions described below. Additionally or alternatively, the UE 115 may perform aspects the functions described below using special-purpose hardware.

At block 2405, the UE 115 may receive set of pilot tones adjacent to each other, wherein the pilot tones are surrounded by null tones as described above with reference to FIGS. 2 through 5. In some examples, the operations of block 2405 may be performed by the pilot tone component as described with reference to FIGS. 7 and 8.

At block 2410, the UE 115 may perform a joint estimation based on the set of pilot tones and null tones as described above with reference to FIGS. 2 through 5. In some examples, the operations of block 2410 may be performed by the pilot tone component as described with reference to FIGS. 7 and 8.

At block 2415, the UE 115 may generate a channel estimate and a phase noise estimate using a joint estimation based on the pilot tones and null tones as described above with reference to FIGS. 2 through 5. In some examples, the operations of block 2415 may be performed by the joint estimation component as described with reference to FIGS. 7 and 8.

At block 2420, the UE 115 may transmit a channel information message to a base station based on the channel estimate and the phase noise estimate as described above with reference to FIGS. 2 through 5. In some examples, the operations of block 2420 may be performed by the channel information component as described with reference to FIGS. 7 and 8.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for channel information reporting and CSI estimation with phase noise.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may additionally or alternatively be physically located at various positions, including being distributed such that portions of functions are implemented at different (physical) locations. Additionally or alternatively, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Additionally or alternatively, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are additionally or alternatively included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may additionally or alternatively cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may additionally or alternatively be called forward link transmissions while the UL transmissions may additionally or alternatively be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for channel information reporting and CSI estimation with phase noise. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may additionally or alternatively be implemented as a combination of computing devices (e.g., a combination of a DSP and a microprocessor, multiple microprocessors, one or more microprocessors in conjunction with a DSP core, or any other such examples). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may additionally or alternatively be implemented, in whole or in part, with instructions embodied in a memory, formatted to be executed by one or more general or application-specific processors.

In the appended figures, similar components or features may have the same reference label. Additionally or alternatively, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
   receiving, at a user equipment (UE) during a symbol period, at least one phase noise compensation reference signal (PC-RS) and at least one channel state information reference signal (CSI-RS);
   determining a first channel information indication and a second channel information indication, wherein the first channel information indication is based at least in part on both the CSI-RS and the PC-RS, and wherein the second channel information indication is based at least in part on the CSI-RS; and
   transmitting a channel information message to a base station, the channel information message comprising a phase noise corrected channel measurement in the first channel information indication and a non-phase noise corrected channel measurement in the second channel information indication.

2. The method of claim 1, further comprising:
   generating the channel information message that comprises the first channel information indication and the second channel information indication.

3. The method of claim 1, further comprising:
   identifying a channel measurement based at least in part on the CSI-RS;
   determining the non-phase noise corrected channel measurement based at least in part on the CSI-RS; and
   generating the second channel information indication comprising the non-phase noise corrected channel measurement.

4. The method of claim 1, wherein the first channel information indication and the second channel information indication each comprises at least one of a channel quality information (CQI), a rank indicator, a precoding matrix indicator, a beam indicator, or combinations thereof.

5. The method of claim 1, further comprising:
   identifying a channel measurement based at least in part on the CSI-RS; and
   identifying a phase noise correction factor based at least in part on the PC-RS.

6. The method of claim 1, further comprising:
   receiving, from the base station, a channel reporting format message that comprises a format indicator for the channel information message.

7. The method of claim 6, wherein the channel reporting format message is received on a physical downlink control channel (PDCCH).

8. The method of claim 7, further comprising:
   decoding a one or more bits in a downlink control indicator (DCI) that conveys an indication of the format indicator for the channel information message.

9. The method of claim 6, wherein the format indicator comprises at least one of a request for the UE to report the first channel information indication or a second channel information indication or a request for the UE to report both the first channel information indication and the second channel information indication.

10. The method of claim 1, wherein the channel information message is transmitted on a physical uplink control channel (PUCCH).

11. The method of claim 1, wherein the channel information message is transmitted in a random access channel (RACH) subframe.

12. The method of claim 1, wherein the channel information message is transmitted in an uplink control information (UCI) of a physical uplink shared channel (PUSCH).

13. The method of claim 1, further comprising:
generating a channel estimate and a phase noise estimate using a joint estimation based at least in part on the CSI-RS, the PC-RS, or a combination thereof; and
transmitting the channel information message to the base station based at least in part on the channel estimate and the phase noise estimate, wherein the channel information message comprises the phase noise corrected channel measurement in the first channel information indication and the non-phase noise corrected channel measurement in the second channel information indication.

14. The method of claim 13, further comprising:
identifying a plurality of pilot tones adjacent to each other, wherein the joint estimation is based at least in part on the plurality of pilot tones and the plurality of pilot tones are surrounded in a frequency domain by a plurality of null tones.

15. The method of claim 14, further comprising:
adjusting a location of the plurality of pilot tones in the frequency domain, wherein the adjusting is based at least in part on a frequency hopping pattern.

16. The method of claim 14, further comprising:
determining a category associated with a receiving device; and
adjusting a number of the plurality of pilot tones based at least in part on the determined category.

17. The method of claim 13, further comprising:
receiving a periodic signal comprising at least one repetition of the CSI-RS, wherein the joint estimation is based at least in part on the periodic signal, wherein the periodic signal in time domain is generated by inserting a CSI-RS tone in every n-th tone of the periodic signal and by inserting null values in other tones of the periodic signal.

18. The method of claim 17, further comprising:
identifying a time periodicity of the periodic signal; and
determining a phase noise variation based at least in part on the CSI-RS, the periodic signal, and the time periodicity of the periodic signal, wherein the joint estimation is based at least in part on the phase noise variation.

19. A method of wireless communication comprising:
transmitting, to a user equipment (UE) during a symbol period, at least one phase noise compensation reference signal (PC-RS) and at least one channel state information reference signal (CSI-RS); and
receiving a channel information message comprising a phase noise corrected channel measurement in a first channel information indication and a non-phase noise corrected channel measurement in a second channel information indication, wherein the first channel information indication is based at least in part on the CSI-RS and the PC-RS, and wherein the second channel information indication is based at least in part on the CSI-RS.

20. The method of claim 19, further comprising:
transmitting, to the UE, a channel reporting format message that comprises a format indicator for the channel information message, wherein the channel reporting format message is transmitted on a physical downlink control channel (PDCCH).

21. The method of claim 20, wherein the format indicator comprises at least one of a request for the UE to report the first channel information or a second channel information or a request for the UE to report the first channel information indication and the second channel information indication.

22. The method of claim 20, further comprising:
reserving one or more bits in a downlink control indicator (DCI) to convey an indication of the format indicator for the channel information message.

23. The method of claim 19, further comprising:
receiving the channel information message from the UE, the channel information message based at least in part on a channel estimate and a phase noise estimate generated using a joint estimation based at least in part on the CSI-RS.

24. The method of claim 23, further comprising:
transmitting a periodic signal comprising at least one repetition of the CSI-RS, wherein the joint estimation is based at least in part on the periodic signal.

25. An apparatus for wireless communication, comprising:
a processor;
memory in electronic communication with the processor; and
instructions stored in the memory and operable, when executed by the processor, to cause the apparatus to:
receive, at a user equipment (UE) during a symbol period, at least one phase noise compensation reference signal (PC-RS) and at least one channel state information reference signal (CSI-RS);
determine each of a first channel information indication and a second channel information indication, wherein the first channel information indication is based at least in part on both the CSI-RS and the PC-RS, and wherein the second channel information indication is based at least in part on the CSI-RS; and
transmit a channel information message to a base station, the channel information message comprising a phase noise corrected channel measurement in the first channel information indication and a non-phase noise corrected channel measurement in the second channel information indication.

26. The apparatus of claim 25, wherein the instructions are operable to cause the processor to cause the apparatus to:
generate a channel estimate and a phase noise estimate using a joint estimation based at least in part on the CSI-RS; and
transmit the channel information message to the base station based at least in part on the channel estimate and the phase noise estimate.

27. An apparatus for wireless communication, comprising:
a processor;
memory in electronic communication with the processor; and
instructions stored in the memory and operable, when executed by the processor, to cause the apparatus to:
transmit, to a user equipment (UE) during a symbol period, at least one phase noise compensation reference signal (PC-RS) and at least one channel state information reference signal (CSI-RS); and
receive a channel information message comprising a phase noise corrected channel measurement in a first channel information indication and a non-phase noise corrected channel measurement in a second channel information indication, wherein the first channel information indication is based at least in part on the CSI-RS and the PC-RS, and wherein the second channel information indication is based at least in part on the CSI-RS.

28. The apparatus of claim 27, wherein the instructions are operable to cause the processor to cause the apparatus to:
receive the channel information message from the UE, the channel information message based at least in part on a channel estimate and a phase noise estimate generated using a joint estimation based at least in part on the CSI-RS.

\* \* \* \* \*